United States Patent [19]
DeBey

[11] Patent Number: 5,701,582
[45] Date of Patent: Dec. 23, 1997

[54] METHOD AND APPARATUS FOR EFFICIENT TRANSMISSIONS OF PROGRAMS

[75] Inventor: Henry C. DeBey, Bougival, France

[73] Assignee: Delta Beta Pty. Ltd., West Perth, Australia

[21] Appl. No.: 408,440

[22] Filed: Mar. 22, 1995

Related U.S. Application Data

[63] Continuation-in-part of Ser. No. 173,865, Dec. 23, 1993, Pat. No. 5,421,031, which is a continuation of Ser. No. 835,947, filed as PCT/AU90/00370, Aug. 23, 1990, abandoned.

[30] Foreign Application Priority Data

Aug. 23, 1989 [AU] Australia ................. PJ5933

[51] Int. Cl.$^6$ .............. H04Q 3/54; G06F 3/14; G06F 9/44
[52] U.S. Cl. ............... 455/5.1; 395/800; 395/353; 455/4.2; 348/17; 348/12
[58] Field of Search ........................ 395/100, 800, 395/353; 364/DIG. 1, DIG. 2; 358/342; 348/96, 220, 7, 12, 17, 13; 455/17, 5.1, 4.1, 6.1, 4.2; 235/380; 340/825.25; 360/77.12

[56] References Cited

U.S. PATENT DOCUMENTS

| | | | |
|---|---|---|---|
| 4,028,733 | 6/1977 | Ulicki | 395/100 |
| 4,320,503 | 3/1982 | Acampora | 370/104.1 |
| 4,357,493 | 11/1982 | Anderson et al. | 340/825.25 |
| 4,358,672 | 11/1982 | Hyatt et al. | 235/380 |
| 4,400,727 | 8/1983 | Aron | 348/96 |
| 4,422,112 | 12/1983 | Tanaka | 360/77.12 |
| 4,439,785 | 3/1984 | Leonard | 358/335 |
| 4,449,198 | 5/1984 | Kroon et al. | 358/342 |
| 4,475,123 | 10/1984 | Dumbauld et al. | 455/4.1 |
| 4,506,387 | 3/1985 | Walter | 348/10 |
| 4,544,960 | 10/1985 | Konishi | 348/220 |
| 4,600,921 | 7/1986 | Thomas | 340/825.31 |
| 4,607,364 | 8/1986 | Neumann et al. | 370/99 |
| 4,698,805 | 10/1987 | Sasuta et al. | 455/17 |
| 4,849,817 | 7/1989 | Short | 348/385 |
| 5,150,357 | 9/1992 | Hopner et al. | 370/68.1 |

Primary Examiner—Daniel H. Pan
Attorney, Agent, or Firm—Pennie & Edmonds

[57] ABSTRACT

A system and method of optimizing transmission of a program to multiple users over a distribution system, with particular application to video-on-demand for a CATV network. The system includes, at a head end of the CATV network a scheduling and routing computer for dividing the video program stored in long term fast storage or short term fast storage into a plurality of program segments, and a subscriber distribution node for transmitting the program segments in a redundant sequence in accordance with a scheduling algorithm. At a receiver of the CATV network there is provided a buffer memory for storing the transmitted video program segments for subsequent playback whereby, in use, the scheduling algorithm can ensure that a user's receiver will receive all of the program segments in a manner that will enable continuous playback in real time of the program. Under the control of controller the receiver distinguishes received program segments by a segment identifier so that redundant segments captured in capture memory are then stored in buffer memory from which the segments can be retrieved and decompressed in data compressor for immediate or subsequent viewing. In one embodiment, the method of this invention includes dividing at least some segments into fragments, and transmitting one fragment of each segment during a playback interval of a duration, for example, equal to a playback time of a segment.

37 Claims, 21 Drawing Sheets

| Entire Program | Program Segments | Fragmented Segments | Fragment as Fraction of Total |
|---|---|---|---|
| | 1 | 1:1 | 0.125 |
| | 2 | 2:1 | 0.063 |
| | | 2:2 | 0.063 |
| | 3 | 3:1 | 0.042 |
| | | 3:2 | 0.042 |
| | | 3:3 | 0.042 |
| | 4 | 4:1 | 0.031 |
| | | 4:2 | 0.031 |
| | | 4:3 | 0.031 |
| | | 4:4 | 0.031 |
| | 5 | 5:1 | 0.025 |
| | | 5:2 | 0.025 |
| | | 5:3 | 0.025 |
| | | 5:4 | 0.025 |
| | | 5:5 | 0.025 |
| | 6 | 6:1 | 0.021 |
| | | 6:2 | 0.021 |
| | | 6:3 | 0.021 |
| | | 6:4 | 0.021 |
| | | 6:5 | 0.021 |
| | | 6:6 | 0.021 |
| | 7 | 7:1 | 0.018 |
| | | 7:2 | 0.018 |
| | | 7:3 | 0.018 |
| | | 7:4 | 0.018 |
| | | 7:5 | 0.018 |
| | | 7:6 | 0.018 |
| | | 7:7 | 0.018 |
| | 8 | 8:1 | 0.016 |
| | | 8:2 | 0.016 |
| | | 8:3 | 0.016 |
| | | 8:4 | 0.016 |
| | | 8:5 | 0.016 |
| | | 8:6 | 0.016 |
| | | 8:7 | 0.016 |
| | | 8:8 | 0.016 |
| Confirmation total of Fragments | | | 1.000 |
| FRAGMENTATION STRUCTURE | | | |

FIG. 8

| Interval Number | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| Segment | Fragment Bandwidth | | | | | | | | | | | | | | | | | | | | | | | | | | | | | | | | |
| 1 | 0.125 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 |
| 2 | 0.063 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 |
| 3 | 0.042 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 |
| 4 | 0.031 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 |
| 5 | 0.025 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 |
| 6 | 0.021 | 6:1 | 6:2 | 6:3 | 6:4 | 6:5 | 6:6 | 6:1 | 6:2 | 6:3 | 6:4 | 6:5 | 6:6 | 6:1 | 6:2 | 6:3 | 6:4 | 6:5 | 6:6 | 6:1 | 6:2 | 6:3 | 6:4 | 6:5 | 6:6 | 6:1 | 6:2 | 6:3 | 6:4 | 6:5 | 6:6 | 6:1 | 6:2 |
| 7 | 0.018 | 7:1 | 7:2 | 7:3 | 7:4 | 7:5 | 7:6 | 7:7 | 7:1 | 7:2 | 7:3 | 7:4 | 7:5 | 7:6 | 7:7 | 7:1 | 7:2 | 7:3 | 7:4 | 7:5 | 7:6 | 7:7 | 7:1 | 7:2 | 7:3 | 7:4 | 7:5 | 7:6 | 7:7 | 7:1 | 7:2 | 7:3 | 7:4 |
| 8 | 0.016 | 8:1 | 8:2 | 8:3 | 8:4 | 8:5 | 8:6 | 8:7 | 8:8 | 8:1 | 8:2 | 8:3 | 8:4 | 8:5 | 8:6 | 8:7 | 8:8 | 8:1 | 8:2 | 8:3 | 8:4 | 8:5 | 8:6 | 8:7 | 8:8 | 8:1 | 8:2 | 8:3 | 8:4 | 8:5 | 8:6 | 8:7 | 8:8 |
| Interval bandwidth = | 0.340 | | | | | | | | | | | | | | | | | | | | | | | | | | | | | | | | |
| Total bandwidth = | 2.718 | | | | | | | | | | | | | | | | | | | | | | | | | | | | | | | | |

TRANSMISSION STRUCTURE

[Figure: Playback Structure table showing Interval Numbers 1-21, with sections for Incoming Fragments, Fragments Playing Back, Buffer Contents, and Buffer as Percent of Whole (34.0%, 42.9%, 45.7%, 44.2%, 39.7%, 32.6%, 23.4%, 12.5%).]

| | Entire Program | Program Segments | Fragmented Segments | Fragmented as Fraction of Total | |
|---|---|---|---|---|---|
| | | | 1:1 | 0.042 | |
| | | 1 | 1:2 | 0.042 | |
| | | | 1:3 | 0.042 | |
| | | | 2:1 | 0.042 | |
| | | 2 | 2:2 | 0.042 | |
| | | | 2:3 | 0.042 | |
| | | | 3:1 | 0.042 | |
| | | 3 | 3:2 | 0.042 | |
| | | | 3:3 | 0.042 | |
| | | | 4:1 | 0.031 | |
| | | 4 | 4:2 | 0.031 | |
| | | | 4:3 | 0.031 | |
| | | | 4:4 | 0.031 | |
| | | | 5:1 | 0.025 | |
| | | | 5:2 | 0.025 | |
| | | 5 | 5:3 | 0.025 | |
| | | | 5:4 | 0.025 | |
| | | | 5:5 | 0.025 | |
| | | | 6:1 | 0.021 | |
| | | | 6:2 | 0.021 | |
| | | 6 | 6:3 | 0.021 | |
| | | | 6:4 | 0.021 | |
| | | | 6:5 | 0.021 | |
| | | | 6:6 | 0.021 | |
| | | | 7:1 | 0.018 | |
| | | | 7:2 | 0.018 | |
| | | | 7:3 | 0.018 | |
| | | 7 | 7:4 | 0.018 | |
| | | | 7:5 | 0.018 | |
| | | | 7:6 | 0.018 | |
| | | | 7:7 | 0.018 | |
| | | | 8:1 | 0.016 | |
| | | | 8:2 | 0.016 | |
| | | | 8:3 | 0.016 | |
| | | 8 | 8:4 | 0.016 | |
| | | | 8:5 | 0.016 | |
| | | | 8:6 | 0.016 | |
| | | | 8:7 | 0.016 | |
| | | | 8:8 | 0.016 | |
| | | | | ======= | |
| | | | Confirmation total of Fragments | 1.000 | |
| | | | FRAGMENTATION STRUCTURE | | |
| | | | Bandwidth Minimization | | |

| Entire Program | Program Segments | Fragmented Segments | Fragment as Fraction of Total |
|---|---|---|---|
| | 1 | 1:1 | 0.125 |
| | 2 | 2:1 | 0.063 |
| | | 2:2 | 0.063 |
| | 3 | 3:1 | 0.042 |
| | | 3:2 | 0.042 |
| | | 3:3 | 0.042 |
| | 4 | 4:1 | 0.031 |
| | | 4:2 | 0.031 |
| | | 4:3 | 0.031 |
| | | 4:4 | 0.025 |
| | 5 | 5:1 | 0.025 |
| | | 5:2 | 0.025 |
| | | 5:3 | 0.025 |
| | | 5:4 | 0.025 |
| | | 5:5 | 0.025 |
| | 6 | 6:1 | 0.021 |
| | | 6:2 | 0.021 |
| | | 6:3 | 0.021 |
| | | 6:4 | 0.021 |
| | | 6:5 | 0.021 |
| | | 6:6 | 0.021 |
| | 7 | 7:1 | 0.021 |
| | | 7:2 | 0.021 |
| | | 7:3 | 0.021 |
| | | 7:4 | 0.021 |
| | | 7:5 | 0.021 |
| | | 7:6 | 0.021 |
| | 8 | 8:1 | 0.021 |
| | | 8:2 | 0.021 |
| | | 8:3 | 0.021 |
| | | 8:4 | 0.021 |
| | | 8:5 | 0.021 |
| | | 8:6 | 0.021 |
| Confirmation total of Fragments | | | 1.000 |
| FRAGMENTATION STRUCTURE Bandwidth Minimization | | | |

TRANSMISSION STRUCTURE
Buffer Minimization

| Interval Number | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|---|
| Segment | Fragment | Bandwidth | | | | | | | | | | | | | | | | | | | | | | | | | | | | | | | | | |
| 1 | | 0.125 | 1:1 | 1:1 | | | | | | | | | | | | | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | 1:1 | |
| 2 | | 0.063 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 | 2:1 | 2:2 |
| 3 | | 0.042 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 | 3:3 | 3:1 | 3:2 |
| 4 | | 0.031 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 | 4:1 | 4:2 | 4:3 | 4:4 |
| 5 | | 0.025 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 | 5:3 | 5:4 | 5:5 | 5:1 | 5:2 |
| 6 | | 0.021 | 6:1 | 6:2 | 6:3 | 6:4 | 6:5 | 6:6 | 6:1 | 6:2 | 6:3 | 6:4 | 6:5 | 6:6 | 6:1 | 6:2 | 6:3 | 6:4 | 6:5 | 6:6 | 6:1 | 6:2 | 6:3 | 6:4 | 6:5 | 6:6 | 6:1 | 6:2 | 6:3 | 6:4 | 6:5 | 6:6 | 6:1 | 6:2 |
| 7 | | 0.021 | 7:1 | 7:2 | 7:3 | 7:4 | 7:5 | 7:6 | 7:1 | 7:2 | 7:3 | 7:4 | 7:5 | 7:6 | 7:1 | 7:2 | 7:3 | 7:4 | 7:5 | 7:6 | 7:1 | 7:2 | 7:3 | 7:4 | 7:5 | 7:6 | 7:1 | 7:2 | 7:3 | 7:4 | 7:5 | 7:6 | 7:1 | 7:2 |
| 8 | | 0.021 | 8:1 | 8:2 | 8:3 | 8:4 | 8:5 | 8:6 | 8:1 | 8:2 | 8:3 | 8:4 | 8:5 | 8:6 | 8:1 | 8:2 | 8:3 | 8:4 | 8:5 | 8:6 | 8:1 | 8:2 | 8:3 | 8:4 | 8:5 | 8:6 | 8:1 | 8:2 | 8:3 | 8:4 | 8:5 | 8:6 | 8:1 | 8:2 |
| Interval Bandwidth = | | 0.348 | | | | | | | | | | | | | | | | | | | | | | | | | | | | | | | | | |
| Total Bandwidth = | | 2.783 | | | | | | | | | | | | | | | | | | | | | | | | | | | | | | | | | |

FIG. 16

| Interval Number | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| Segment | Segment Bandwidth | | | | | | | | | | | | | | | | | | | | | | | | | | | | | | | | |
| 1 | 0.125 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 0.125 | | 2 | | 2 | | 2 | | 2 | | 2 | | 2 | | 2 | | 2 | | 2 | | 2 | | 2 | | 2 | | 2 | | 2 | | 2 | | 2 |
| 3 | 0.125 | | | 3 | | | 3 | | | 3 | | | 3 | 2 | | 3 | | | 3 | | | 3 | | | 3 | | | 3 | | | 3 | | |
| 4 | 0.125 | | | | 4 | | | | 4 | | | | 4 | | | | 4 | | | | 4 | | | | 4 | | | | 4 | | | | 4 |
| 5 | 0.125 | | | | | 5 | | | | | 5 | | | | | 5 | | | | 5 | | | | | | 5 | | | | | 5 | | |
| 6 | 0.125 | | | | | | 6 | | | | | | 6 | | | | | | 6 | | | | | | 6 | | | | | | 6 | | |
| 7 | 0.125 | | | | | | | 7 | | | | | | 7 | | | | | | | | 7 | | | | | | | 7 | | | | |
| 8 | 0.125 | | | | | | | | 8 | | | | | | | | 8 | | | | | | | | 8 | | | | | | | | 8 |
| Interval Bandwidth = | | 1 | 2 | 2 | 3 | 2 | 4 | 2 | 4 | 2 | 3 | 1 | 5 | 3 | 3 | 3 | 4 | 1 | 4 | 1 | 4 | 3 | 2 | 1 | 6 | 2 | 2 | 2 | 4 | 1 | 5 | 1 | 4 |
| Total Avg. Bandwidth = | 2.656 | | | | | | | | | | | | | | | | | | | | | | | | | | | | | | | | |

TRANSMISSION STRUCTURE
Standard

FIG. 17

| Interval Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| Segment | Segment Bandwidth | | | | | | | | | | | | | | | | | | | | | | | | | | | | | | | |
| 1 | 0.125 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 0.125 | 2 | | 2 | 2 | | 2 | 2 | 2 | 2 | 2 | | 2 | | 2 | 2 | 2 | | 2 | 2 | 2 | | 2 | | 2 | | 2 | | 2 | 2 | 2 | 2 |
| 3 | 0.125 | | 3 | | | 3 | 3 | | | 3 | | | 3 | | | 3 | | | 3 | | | 3 | | | 3 | | | 3 | | | 3 | | |
| 4 | 0.125 | | | 4 | | | | | 4 | | | | | 4 | | | | 4 | | | | 4 | | | | 4 | | | | 4 | | | |
| 5 | 0.125 | | | | 5 | | | | | | 5 | | | | | 5 | | | | | 5 | | | | | 5 | | | | | 5 | | |
| 6 | 0.125 | | | | | | | 6 | | | | | 6 | | | | | | | 6 | | | | | | | 6 | | | | 6 | | 6 |
| 7 | 0.125 | | | | | | | 7 | | | | | | | 7 | | | | | | | 7 | 7 | | | | | | | 7 | | | |
| 8 | 0.125 | | | | | | | | | 8 | | | | | | | | 8 | | | | | | | | | | 8 | | | | | |
| Interval Bandwidth = | | 1 | 2 | 2 | 3 | 2 | 3 | 3 | 3 | 3 | 3 | 1 | 3 | 3 | 3 | 3 | 2 | 3 | 3 | 2 | 3 | 3 | 3 | 1 | 3 | 3 | 3 | 3 | 2 | 3 | 4 | 1 | 3 |
| Total Avg. Bandwidth = | 2.594 | | | | | | | | | | | | | | | | | | | | | | | | | | | | | | | | |

TRANSMISSION STRUCTURE
Delayed Segments

METHOD AND APPARATUS FOR EFFICIENT TRANSMISSIONS OF PROGRAMS

CROSS-REFERENCE TO RELATED APPLICATIONS

This application is a continuation-in-part of U.S. patent application Ser. No. 08/173,865 filed on Dec. 23, 1993, now U.S. Pat. No. 5,421,031, entitled Method and System of Program Transmission Optimization using a Redundant Transmission Sequence, which is a continuation of 07/835,947 filed Apr. 2, 1992, now abandoned, which priority application is PCT/AU90/00370 filed Aug. 23, 1990 on the basis of Australian application PJ5933 filed Aug. 23, 1989. The above applications are incorporated herein by reference.

FIELD OF THE INVENTION

The present invention relates to a system and method for program transmission optimization over a distribution system and relates particularly, though not exclusively, to a method and system for video transmission optimization.

DISCUSSION OF THE PRIOR ART

Throughout the following specification the word "program" should be understood in the broadest sense of the term and includes any information, whether visual, tactile, olfactory, audible, or other information, a mixture of these or otherwise, which is normally perceived in a substantially continuous sequence of impressions through one or more of the human senses. The term "video program" refers to a program of visual information or visual and audible information, whether recorded in reproducible format or transmitted "live". In our "information society", with its increasing emphasis on greater accessibility to information, there are many situations where the same program may be required to be accessed by more than one person at the same time.

Thus, for example, in a library of a large educational institution which stores lectures and other information on audio and/or video cassettes, the demand for certain programs may be particularly high at certain times and there is a need to be able to allow several students to listen to or view the program simultaneously from the beginning, without having to force individuals to start listening to or viewing the program at the same time. Ideally, it should be possible to service the needs of all persons requiring that program immediately when it is requested. In practice this is extremely difficult without expensive duplication of equipment and complex electronic processing. Another example of this type of multiple user situation is so called video-on-demand television. A video-on-demand system ideally allows any subscriber to request (demand) any particular video program at any time of the day.

A prior art video-on-demand system is described in U.S. Pat. No. 4,506,387 to Walter in which each video program is pre-programmed in a memory device selectable by a host computer at a central data station in response to an address signal transmitted from the user. The host computer controls the transmission of the video program at a high non-real-time rate over a fibre optic line network to a data receiving station at the users location. The data receiving station then converts the received optical data to electrical data and stores it for subsequent real-time transmission to the users television set.

There are a number of significant disadvantages with the system of Walter, the foremost being that it is incompatible with existing television transmission networks, and in particular CATV coaxial cable networks. In order to achieve a rapid response time Walter transmits all of the digital data corresponding to an entire program to the receiving station over a plurality of fibre optic lines within a very short time. Even with compression of the digital data the bandwidth requirement for this system is relatively large. For example, sixteen (16) optical data channels over four fibre optic lines are required to transmit a two hour movie in about thirty one seconds. Very few homes or buildings currently have ready access to a fibre optic cable, and a fibre optic network is expensive to install.

A further disadvantage with the system of Walter is that it cannot adequately handle a high demand for the same video program. Research in video tape lending libraries indicates that out of a total of say five thousand tapes held in the library, at any one time only a core group of twenty to forty most popular titles are in high demand. Furthermore, this research into the viewing habits of viewers indicates that the core video demand requirement varies throughout the day as the nature of the viewers changes. Walter contemplates that the central data station may transmit only a portion of the selected program to the user for his viewing, and then begin transmitting a portion of another selected program to a second user. A fixed multiplexing scheme, such as that of Walter, services each user's request in turn with a high speed transmission burst which may be a portion or all of a program. It is forced to repeat that burst to start a second user at the beginning of the same program since there is an unvarying FIFO (first in first out) sequence to the program data and no redundancy. If a second user of the same program is physically on the same bus and is to be served before the burst is over the first user must be temporarily denied transmission. Clearly with core video programs this could result in unacceptable delays.

SUMMARY OF THE INVENTION

The present invention was developed with a view to providing a method and system for program transmission optimization over a distribution system for multiple users, and was developed specifically, though not exclusively, with a view to providing a system and method for supplying video-on-demand which is compatible with existing video distribution systems such as CATV. Throughout this specification the term "distribution system" is to be construed in the broadest sense of the term and covers ordinary radio and television networks, including satellite and microwave networks, CATV and internal television/video/audio distribution systems of the kind employed in hotels, educational institutions and more recently in aircraft and ocean liners.

According to one aspect of the present invention there is provided a method of transmitting a program to multiple users over a distribution system, the method comprising:

at a head end of the distribution system, providing a program divided into a plurality of segments; and transmitting the segments from the head end to users' receivers such that, at least some of the segments are transmitted more than once from the head end so as to enable multiple receivers of users requesting playback of the program at different times to simultaneously receive the segments required for continuous playback of the program.

According to another aspect of the present invention there is provided a system for transmitting a program to multiple users comprising:

means for providing a program divided into a plurality of segments at a head end; and means for transmitting the segments from the head end to users' receivers such that at least some of the segments are transmitted more than once so as to enable multiple receivers of users requesting the program at different times to simultaneously receive the segments required for continuous playback of the program.

According to a further aspect of the present invention there is provided a method of transmitting a program to multiple users over a distribution system, comprising:

at a head end of the distribution system, providing a program divided into a plurality of segments; and transmitting the segments from the head end to users' receivers, such that any one segment can simultaneously be sent to more than one receiver with no requirement at any time to dedicate the head end of the distribution system to any specific receivers.

According to a still further aspect of the present invention there is provided a receiver for receiving a program supplied to multiple users over a distribution system from a head end, said program being divided into a plurality of program segments, the receiver comprising:

a buffer storage means for storing a plurality of program segments transmitted from the head end of the distribution system; and a processing means including means for calculating whether segments already held in said buffer storage means will be presented on the distribution system prior to playback and if so removing such segments from the buffer storage means whereby, in use, the program segments required for continuous playback of the program will always be available at the receiver.

BRIEF DESCRIPTION OF DRAWINGS

In order to facilitate a better understanding of the nature of the invention a detailed description of preferred embodiments of a program transmission optimization system and method providing video transmission optimization will now be given, by way of example only, with reference to the accompanying drawings, in which:

FIG. 8 is a table illustrating a different technique for dividing a program into segments;

FIG. 9 is a table illustrating a sequence of transmission of the program segments in FIG. 8 according to an alternative scheduling algorithm;

FIG. 10 is a table illustrating the manner in which segments transmitted according to the scheduling algorithm of FIG. 9 are received and processed by a receiver;

Figure 13:
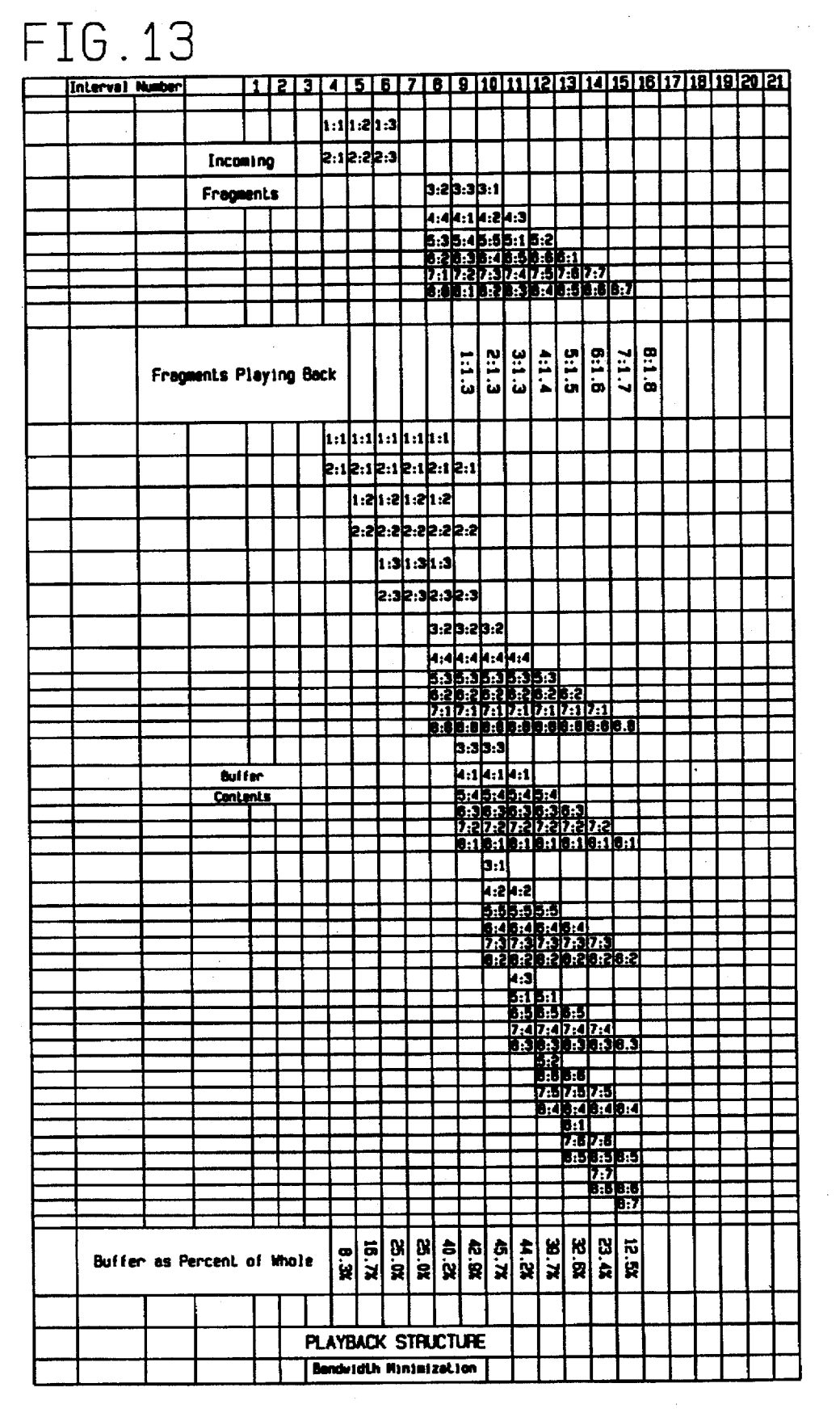

FIGS. 11, 12 and 13 are tables similar to that of FIGS. 8, 9 and 10 respectively, illustrating one technique for bandwidth minimization;

FIGS. 14, 15 and 16 are tables similar to that of FIGS. 8, 9 and 10 respectively illustrating one technique for buffer minimization;

FIGS. 17, 18 and 19 are tables similar to the table of FIG. 9 illustrating alternative techniques for smoothing bandwidth requirements; and, FIG. 20 is a flow chart of the process employed by a receiver for deciding whether or not to accept data for storage in buffer.

DETAILED DESCRIPTION OF A PREFERRED EMBODIMENT

Figure 1:
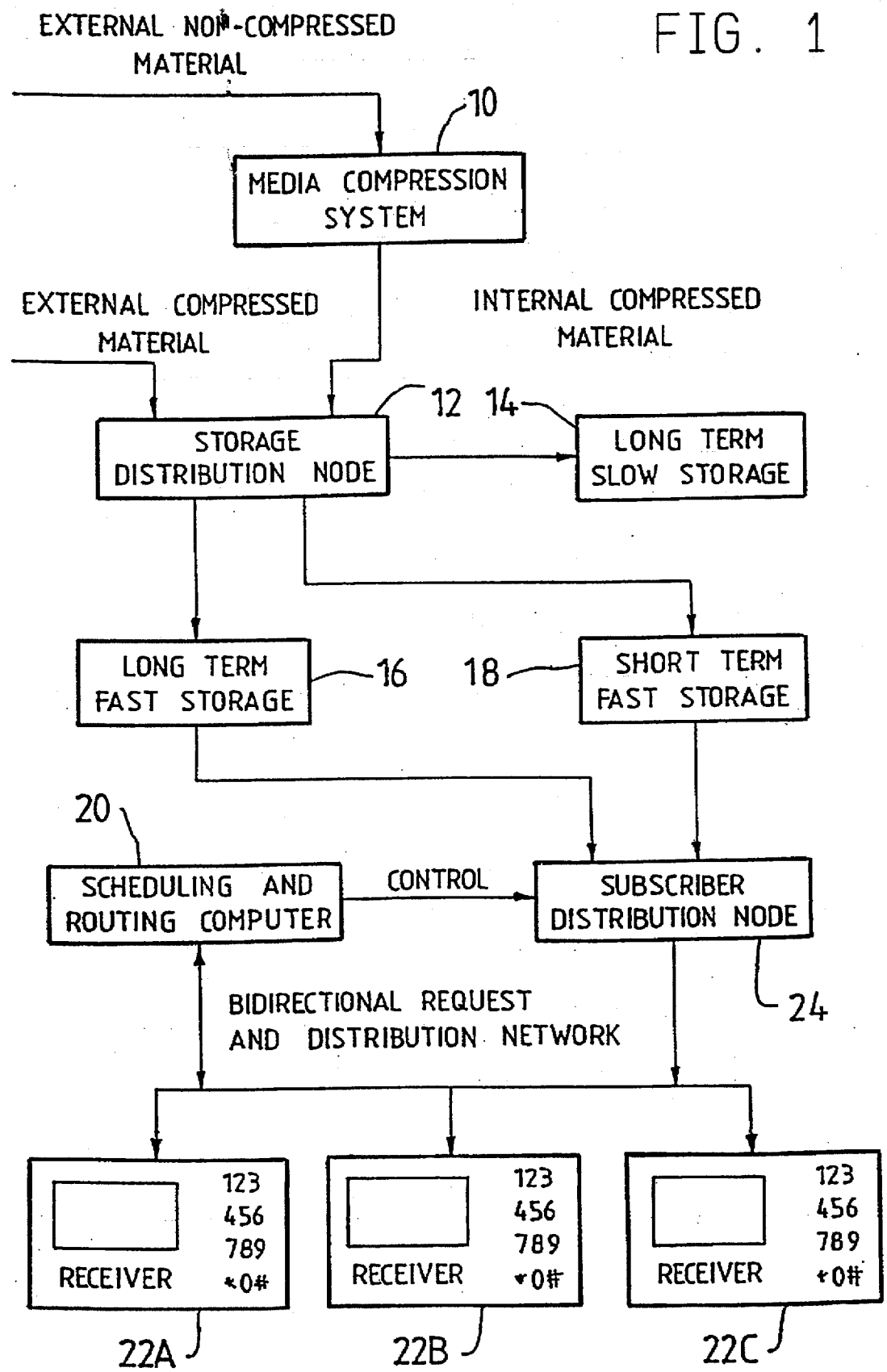
FIG. 1 is a schematic diagram of a first embodiment of a program transmission optimization system in the form of a video-on-demand system.

FIG. 1 illustrates schematically an embodiment of the program transmission optimization system according to the present invention. This embodiment is in the form of a video-on-demand (VOD) system. Referring to FIG. 1, external non-compressed material can enter the system in its most basic format such as 35 mm film, video tape, or through a telecommunications link such as broadcast television or satellite transmission. The non-compressed material is passed through a media compression system 10 for compressing the audio visual program material into a compressed format. The audio visual program material may be compressed by an external video compression service provider. Such external compressed material may enter the system directly via a storage distribution node 12. Standard compression algorithms such as that developed by MPEG may be employed. The storage distribution node 12 routes the compressed video material to the appropriate storage medium.

There are three types of storage in the system, long term slow storage 14, long term fast storage 16 and short term fast storage 18. The division of the storage of compressed video material into the different types of storage is based on commercial considerations, in view of the relatively high cost of fast storage media compared to slow storage media. The selection of the type of storage to which different programs would be routed is based upon the expected future demand for the video material concerned. Daily news segments would probably be stored in short term fast storage 16, whereas a movie classic such as "Gone With The Wind" would probably be stored in long term fast storage 16. Infrequently requested materials such as some obscure silent movie would probably be stored in long term slow storage 14. The storage distribution node 12 is typically a micro or mini computer which controls the flow of data between the different storage devices.

The long term slow storage 14 typically takes the form of storage media such as magnetic tapes, or optical discs and may require human intervention for retrieval of infrequently accessed program material. The long term fast storage 16 may typically take the form of a jukebox type of optical disc storage device. Optical disc storage provides high density storage with random access, and the jukebox access mechanism provides automatic program access. A typical unit currently available is the KODAK Optical Disc System 6800 drive/cabinet. The short term fast storage 18 may take the form of a magnetic disc drive such as an IBM Model 3380. This allows rapid random access to the compressed video material stored in digital format, but is a relatively expensive storage medium and would therefore only be used for storing popular core video programs. The scheduling and routing computer 20 receives requests for specific audio visual material from user's receivers 22A, 22B or 22C via a bi-directional request and distribution network. The scheduling and routing computer 20 controls the retrieval and division of the selected video program in a plurality of video segments, schedules the video segments in accordance with a scheduling algorithm and controls the routing of the scheduled segments for transmission to one or more of the receivers 22A, 22B or 22C, so that each requesting viewer's receiver will receive all of the video segments in a manner that will enable continuous immediate viewing of the program. The video-on-demand system employs a combination of frequency multiplexing and time division multiplexing. The time division multiplexing of the video segments is controlled by the scheduling and routing computer 20 in accordance with the scheduling algorithm. The frequency multiplexing is performed by a subscriber distribution node 24 under the control of the scheduling and routing computer 20. The processing capabilities of the scheduling and routing computer 20 are similar to that required by computers used by banks for automatic teller machines. The scheduling and routing computer 20 may be any suitable computer with a typical processing capability of 1.5 to 200 million instructions per second (MIPS), depending on the size of the subscriber base and other loading factors.

The viewer's receivers 22 are typically frequency agile, to be compatible with the frequency multiplexing employed at the head end of the system. The receivers are provided with processing means to capture the appropriate data packets created by the time division multiplexing of the video segments. The receivers 22 are also provided with buffer storage means for storing the received video segments, and would typically also comprise decompression means for decompressing the video data for subsequent display on a dedicated television screen, or fed into a conventional television set.

The video-on-demand system of FIG. 1 can operate on either analog or digital communication circuits, however in the preferred embodiment described below the video distribution system is a conventional cable television system which is analog. In the preferred embodiment of the system described below primarily modulated digital data is transmitted over the CATV network. However, it is envisaged that a future system will employ a mixture of analog and modulated digital signals.

The method of program transmission optimization according to the invention can provide transmission optimization for either digital or analog information signals.

Conventional CATV systems are typically simplex communication systems (one way only) so that there is no easy way to retransmit data when errors are detected. Accordingly, some form of error compensation is required. Fortunately, television data is generally used in a very transient manner, unlike computer data that must be assured of accurate transmission. If a few frames of a TV image are disturbed most viewers accept this without even a conscious acknowledgment of their occurrence. Accordingly, a much higher bit error rate can be tolerated, for example 1 erroneous data bit per 100,000. At this rate the human eye/brain system normally cannot even detect the video effects caused by this erroneous bit. Most digital modems work with bit error rates of 1 in 100,000,000 to 1 in 1,000,000,000! Therefore, the video-on-demand system can tolerate error rates typically from 1,000 to 10,000 times higher than most computer data systems are presently designed for. A higher error rate will of course improve performance, although the improvement may be imperceptible to a viewer.

Figure 2:
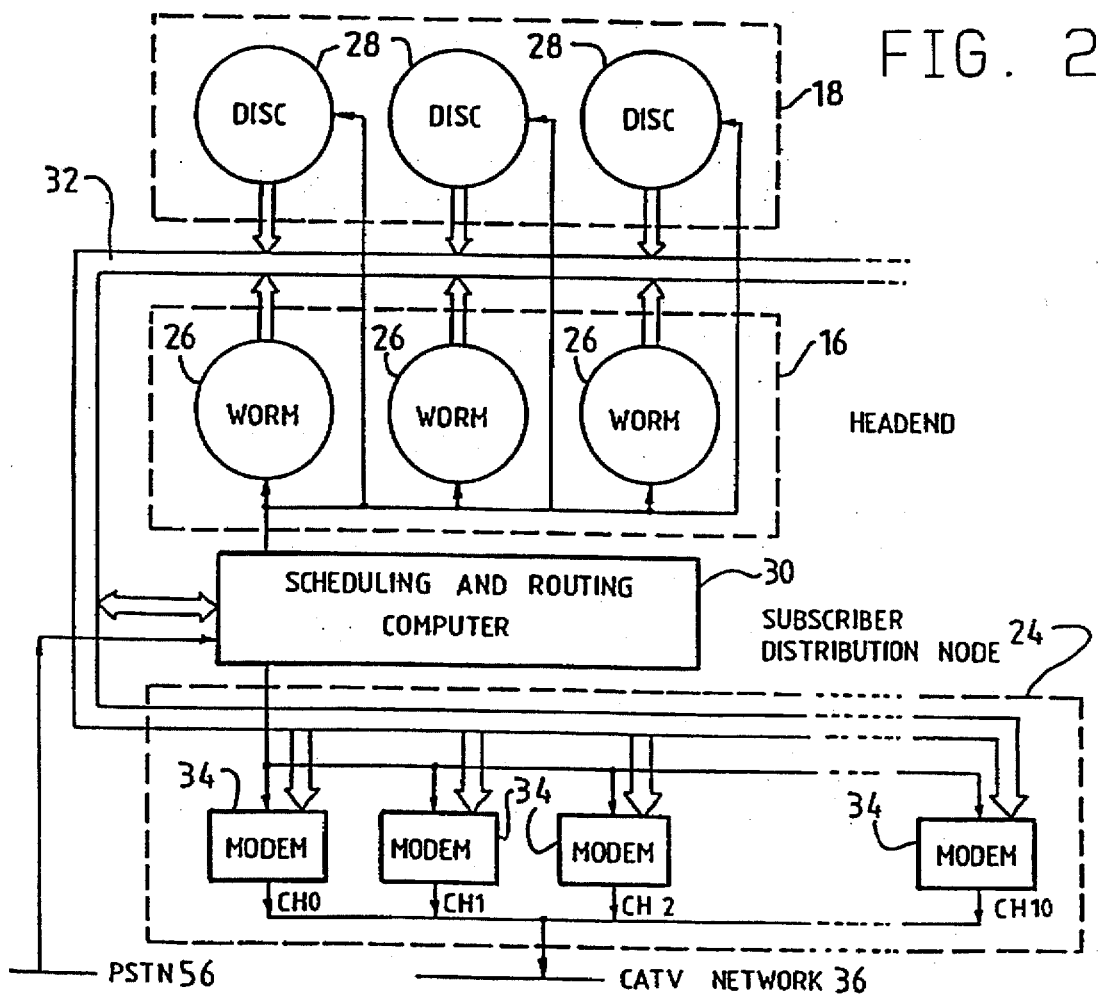
FIG. 2 is a more detailed block diagram illustrating the functional blocks of the video-on-demand system in FIG. 1 applied to a CATV network.
Figure 2:
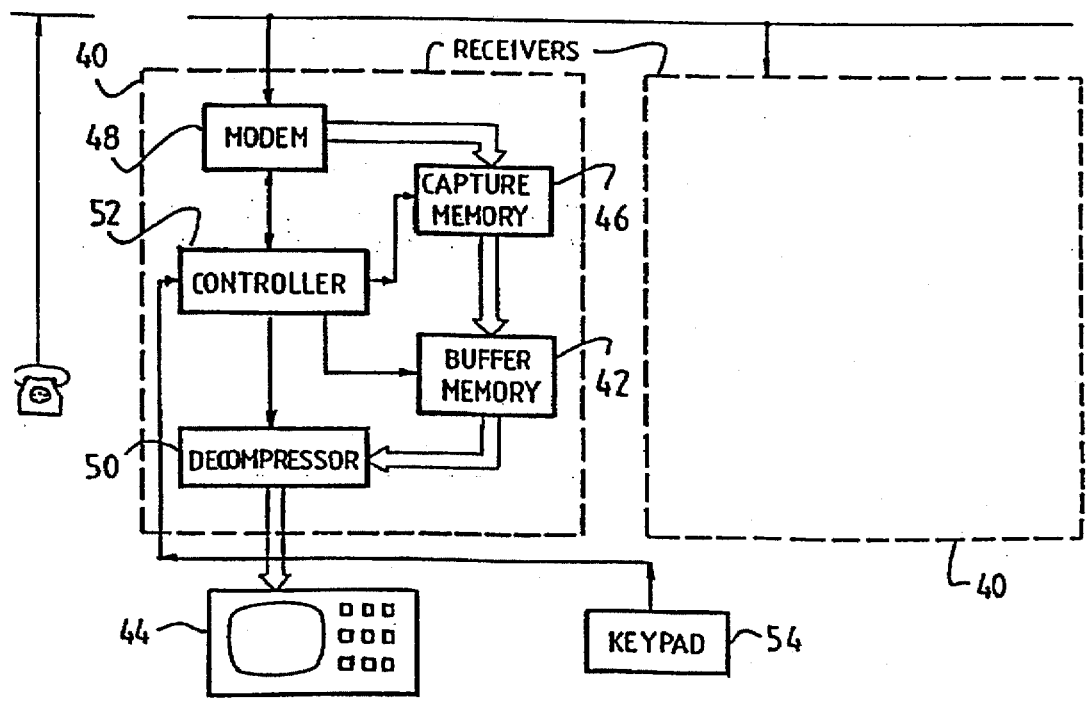

FIG. 2 illustrates in block diagram form a preferred embodiment of the video-on-demand system applied to a CATV network. The video demand system comprises at the head end means for providing a video program in a compressed format in the form of Write Once Read Many (WORM) storage devices and magnetic disc storage devices 28 providing long term fast storage 16 and short term fast storage 18 respectively. In this particular embodiment the compressed video material is stored in digital format in the storage devices and the video programs may already be segmented in the storage media in video packets sized to be compatible with the system specifications. The magnetic disc devices 28 and WORM devices 26 are connected to a scheduling and routing computer 30 by data bus 32.

The scheduling and routing computer 30 responds to a subscriber request for a particular program by retrieving the video program from the appropriate storage media and dividing the video program into a plurality of video segments. As mentioned above, the video program may be stored in the storage media already in segments corresponding to the scheduling requirements of the system thereby reducing the load on the computer 30 during the process of retrieving and dividing the video program into video segments. The computer 30 then schedules the plurality of video segments of the video program in accordance with a scheduling algorithm, as will be described in more detail below, and routes the scheduled video segments for transmission to one or more receivers of viewers requesting the video program. For core video programs (those that are in continuous demand by at least one subscriber for periods of more than one Video Playing Time (VPT)), the scheduling algorithm can be run once and the packets stored in the scheduled sequence on a serial recording device such as a tape drive (not shown), to further reduce loading on the computer.

In this embodiment the subscriber distribution node 24 comprises a plurality of modems 34 under the control of the scheduling and routing computer 30. Each modem 34 modulates a different carrier frequency signal, corresponding to each of the channels on the CATV network 36, for transmitting the video segment data packets routed to the appropriate modem 34 by the scheduling and routing computer 30 over data bus 32.

Each subscriber on the CATV network 36 is provided with a receiver 40 for receiving the video segment data packets corresponding to the requested program and storing the video segments for future viewing by the subscriber. Each receiver 40 typically comprises a buffer memory 42 for storing the video segments of the video program transmitted from the head end, and video processing means for processing the video segments stored in the buffer memory and supplying the segments in the correct sequence to a subscriber television set 44 for viewing. Typically the video processing means may include a controller 52 and a capture memory 46 for capturing the video segment data packets received over the CATV network 36 and demodulated by one or more modems 48 of the receiver. Under the control of controller 52 the video processing means distinguishes received program segments by a segment identifier, for example the PKT ID, so that redundant segments can be ignored and overwritten in capture memory 46. Modem 48 is preferably a frequency agile broad band modem such as the Fairchild M505, although as noted above a more low level digital modem with lower bit error rate can also be employed. Compressed video data packets captured in capture memory 46 are stored in buffer memory 42 from which the segments can be retrieved and decompressed in data decompressor 50 for immediate or subsequent viewing. The microprocessor based controller 52 controls the flow of data and the video processing within the receiver 40.

Some CATV systems can accommodate bidirectional decoders or receivers, and for this type of system the receiver 40 is provided with a key pad 54 to enable the subscriber to initiate a request via the CATV network 36. However, the majority of CATV systems are unidirectional (simplex) and a subscriber request must therefore be made over the public switched telephone network (PSTN) 56. The subscriber request via the PSTN 56 may be verbal or via touch tone keying similar to that provided by other on-line subscriber network service providers.

Security on the system to prevent unauthorized viewing of transmitted programs may be implemented in several ways. Standard encryption algorithms could be applied at the modems 34 prior to transmission. Each receiver 40 would then require a key to decrypt the received data. Encryption/decryption keys are distributed to subscribers in a similar manner to that employed by financial institutions to distribute PINs for automatic teller machine usage. Alternatively, each data packet transmitted at the head end can be prefixed with a receiver ID unique to each subscriber so that a pirate receiver would need to select the appropriate receiver ID in order to receive a particular video program.

It will be appreciated that the video-on-demand system illustrated in FIG. 2 is exemplary only, and that many other hardware implementations could be employed to effect the method and system for supplying video-on-demand according to the invention. For example, the receivers 40 may comprise several modems for simultaneously receiving data packets over several channels, and the capture memory may be dispensed with if the video segments are stored in the buffer memory in compressed format. The video segments are then decompressed when they are provided to the subscriber's television set in the correct sequence for viewing. Furthermore, certain sections of the head end apparatus or of the receiver may be located at different geographical locations. For example, in view of the typical architecture of CATV systems, it is possible that the modem and buffer sections of the receiver will become part of the cable network in what is referred to as a subscriber tap, and that the other sections would be located at the subscriber's premises.

It should be noted that the video segment data packets for a particular program need not be transmitted over the same channel for all viewing subscribers. By employing a combination of time division multiplexing and multiple channels at the head end of the system, data rates over each of the channels can be kept at a minimum therefore allowing the use of less expensive hardware at the receivers. Each receiver 40 may be configured to scan the channels in a cyclic fashion in order to determine which channel or channels the appropriate video segments are being transmitted. In addition to this a dedicated control channel can be provided over which data from the scheduling and routing computer 30 is transmitted to instruct each receiver as to which packets to receive and on which channel(s). However, preferably the head end transmits the video segments in accordance with the scheduling algorithm in a continuous manner, with each video segment provided with a title ID as well as a segment ID, so that each receiver will receive all of the video segments with the appropriate title ID and can discard or overwrite the video segments already received.

A key feature of the present invention is the scheduling of the video segments for transmission in a redundant sequence in a manner that will ensure that each receiver will receive all of the video segments for the requested program according to a schedule that will enable continuous playback in real time of the video program at the receiver. An efficient scheduling algorithm and its implementation will now be described in detail.

In the following description the term "Maximum Response Time" (MRT) refers to the maximum time a subscriber will need to wait before the video program requested will be available for viewing at his receiver. MRT refers to the maximum time that the system has to respond to the demand. Video Play Time (VPT) refers to the time required to play the particular video program when viewed at normal play back speed. The data that comprises the video program must be divided into video segment data packets of such a length that one packet can be transmitted in the time of 1 MRT. The video segment play back time or slot length of one data packet need not be less than 1 MRT and may be longer than 1 MRT depending on how much band width is available over the transmission medium for transmitting the data packet(s) in the time of 1 MRT. The slot length may be variable in order to adjust the instantaneous loading and data rates on the transmission medium or to adjust the amount of buffer storage space required in the receivers. However, in any one installation, the slot length and MRT would normally be fixed for a specific system configuration. In the following description the slot length has been made equal to the MRT in order to simplify explanation. Thus, for example, if the video program is 60 minutes long and the MRT is 5 minutes, the video program is divided into 12 discreet data packets each corresponding to 5 minutes of video segment data. Each of the data packets is numbered from 1 to n where n equals VPT/MRT, in chronological viewing order.

Implementation of the scheduling algorithm is preferably under software controlled by the scheduling and routing computer 30. The basic flow of the scheduling program is as follows:

(i) set MRT equal to chosen maximum response time (ii) set a counter equal to 0 an initial value (iii) retrieve video segment data packets sized to relate to a play time of MRT (PKT1, PKT2 . . . PKTn).

(iv) wait for remainder of period equal to MRT set COUNT equal to COUNT plus 1
if (COUNT Modulo 1)=0 then transmit PKT1
if (COUNT Modulo 2)=0 then transmit PKT2
if (COUNT Modulo 3)=0 then transmit PKT3
if (COUNT Modulo n)=0 then transmit PKTn
start again at (iv)

Note: (x Modulo y)=the remainder of (x divided by y).

From the above it is clear that implementing the scheduling algorithm involves iteratively calculating during each MRT the result of the equation:

$$\text{COUNT Modulo } X = Y \qquad (1)$$

Wherein COUNT=a predetermined initial whole number incremented by 1 after each MRT, and X=1 to n, wherein n=the number of segments into which the program has been divided. Whenever Y=0, the program segment number X will be transmitted.

In accordance with the above scheduling algorithm video segment data packets are transmitted in a redundant sequence, with one or more data packets being transmitted during each MRT. Each transmission starts at an incremental time n*MRT, and in many instances a majority of the MRT period is expended in actually accomplishing the transmissions. With the above scheduling algorithm PKT1 will always be transmitted each MRT, however the other packets may or may not be transmitted at any given value for COUNT. Hence, any particular requesting receiver may receive the packets in a non-contiguous stream. Thus, for an MRT=5 and a VPT=60 it may receive the packets as follows:

| MRT | PKTs Received | PKTs Viewed |
|-----|---------------|-------------|
| 1 | PKT1 AND PKT3 | PKT1 VIEWED |
| 2 | PKT2 | PKT2 VIEWED |
| 3 | PKT4 AND PKT8 AND PKT12 | PKT3 VIEWED |
| 4 | NO PACKETS | PKT4 VIEWED |
| 5 | PKT5 AND PKT6 AND PKT7 AND PKT11 | PKT5 VIEWED |
| 6 | NO PACKETS | PKT6 VIEWED |
| 7 | NO PACKETS | PKT7 VIEWED |
| 8 | PKT9 AND PKT10 | PKT8 VIEWED |
| 9 | | PKT9 VIEWED |
| 10 | | PKT10 VIEWED |
| 11 | | PKT11 VIEWED |
| 12 | | PKT12 VIEWED |

Figure 5:
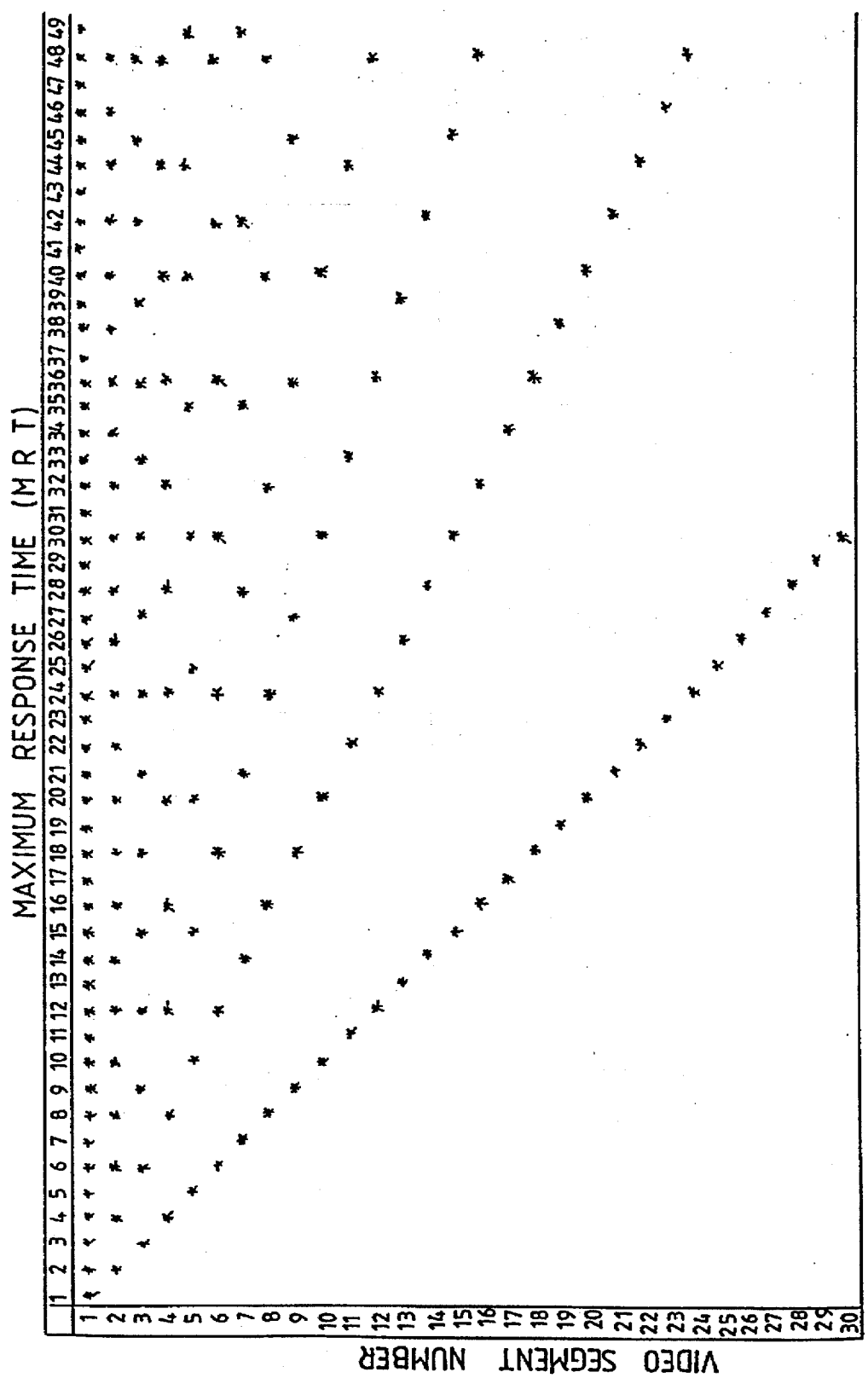
FIG. 5 is a tabular representation of the transmission sequence of video segments in accordance with a scheduling algorithm.
Figure 6:
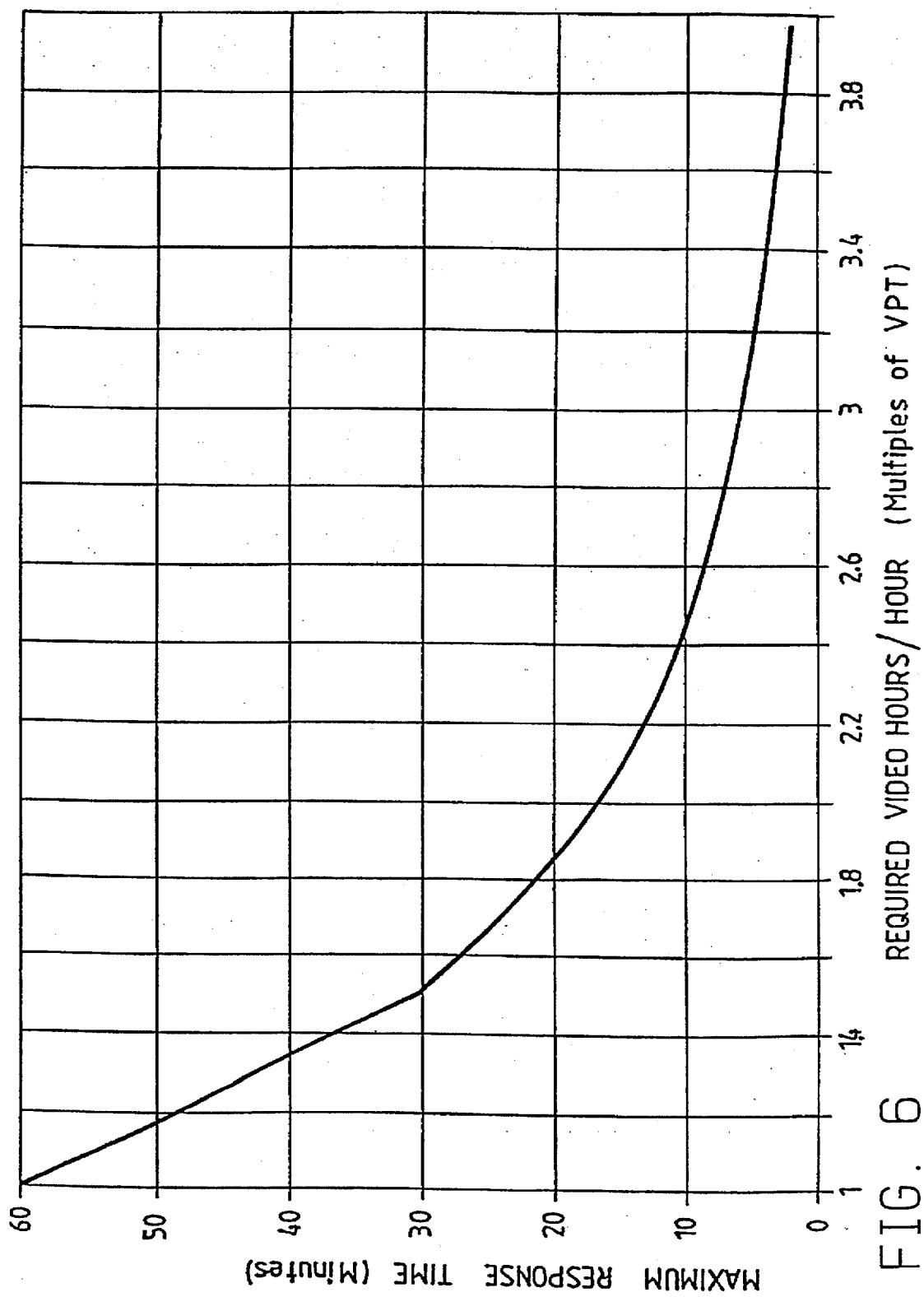
FIG. 6 is a graphical representation of the relationship between Maximum Response Time and the required video-hours/hours of transmission time.

Please note, only PKTs not previously received by the receiver are indicated in the "PKTs Received" column. Redundant pockets are discarded or overwritten by the receiver. The above sequence is just one of many possible packet delivery sequences produced by the algorithm. FIG. 5 is a graphical representation of the sequence of video segment data packets transmitted during each MRT time interval. The number of each video segment appears on the vertical axis and the number of the MRT interval appears along the horizontal axis. FIG. 6 shows a maximum of 30 video segments and 49 MRT intervals, however obviously these are arbitrary numbers and both axes could be continued indefinitely. There would be a practical limit to the number of video segments that the video program could be divided into, however the number of MRT intervals will be a function of the duration for which a particular program is in continuous demand. From casual observance of the sequence output of the algorithm it would appear to be a random ordering of packets. However, although the sequence may be considered pseudo-random, it is in fact non-random in that it ensures that a receiver never has to wait on any packet to be transmitted and can provide immediate viewing of the video segments in the correct sequence. Accordingly, by the time the receiver is ready to display a particular packet, that packet will either be in the buffer memory, or being received at that time.

In the above example sequence it will be noted that within a time equal to 8 MRTs all 12 packets have been received, and that certain packets, for example PKT12, is received by the receiver well before it is needed for viewing. PKT12 and any other packets received early are held in the buffer until the appropriate time for viewing. The scheduling algorithm ensures that a packet is always received when it is due to be viewed or before.

In FIG. 5, it can be seen that at certain times, for example, MRT intervals 12, 24 and 36 a larger number of packets are received than at other times, which tends to increase the load on the transmission medium and the buffer memory in the receivers. It is preferable that the buffer memory be large enough to store all of the data packets for a particular program, and this also enables the receiver to store the program for later viewing if desired.

The underlying design considerations for the scheduling algorithm and the amount of buffer memory required in the receivers involve trade off's between the response time (MRT) guaranteed to viewers, the bandwidth required for servicing requests, and the amount of buffer storage space provided in the receivers. The principle advantage of a scheduling algorithm of the above kind is the efficient utilization of the transmitting medium that can be realized. Thus, for example, if an MRT of 5 minutes is required, without the scheduling algorithm the complete video program would need to be transmitted continuously from the beginning every 5 minutes. Thus, for a program with 60 minutes play time the complete program would have to be transmitted 12 times. Using the above scheduling algorithm the number of data packets required to be transmitted to provide an MRT of 5 minutes is equal to having to transmit the entire program only 3.12 times.

The relationship between MRT and the total amount of data that must be transmitted can be represented by the following "best fit curve" equation:

$$\text{TOTAL DATA} = \frac{\text{LOG} (MRT/154.94)}{-0.47782} \qquad (2)$$

Total data is in terms of VPT, so that a data amount of 3 is equal to 3 times the VPT or 180 minutes worth of data for a 60 minute program supplied with an MRT of 5 minutes. FIG. 6 is a graphical representation of the relationship between MRT and the required video-hours/hour of transmission time or the total amount of data transmitted. It is immediately apparent from FIG. 6 that the longer the maximum response time (MRT) permissible, the lower the volume of data required to be transmitted per hour.

The above equation (2) was derived empirically. Subsequent investigation revealed that TOTAL DATA can be derived accurately using the following equation:

$$\text{TOTAL DATA} = \sum_{\text{Segment Number}=1}^{\text{Number of Segments}} 1/\text{Segment Number} \qquad (3)$$

Using the above example, the TOTAL DATA (which is equivalent to bandwidth required) may be calculated as follows:

$$\begin{aligned}\text{TOTAL DATA} &= \sum_{\text{Segment Number}=1}^{\text{Number of Segments}=8} 1/1 + 1/2 + 1/3 + 1/4 + \\ &\quad 1/5 + 1/6 + 1/7 + 1/8 \\ &= 2.718\end{aligned}$$

This figure compares favorably with the figure of 3.12 derived empirically above.

Figure 3:
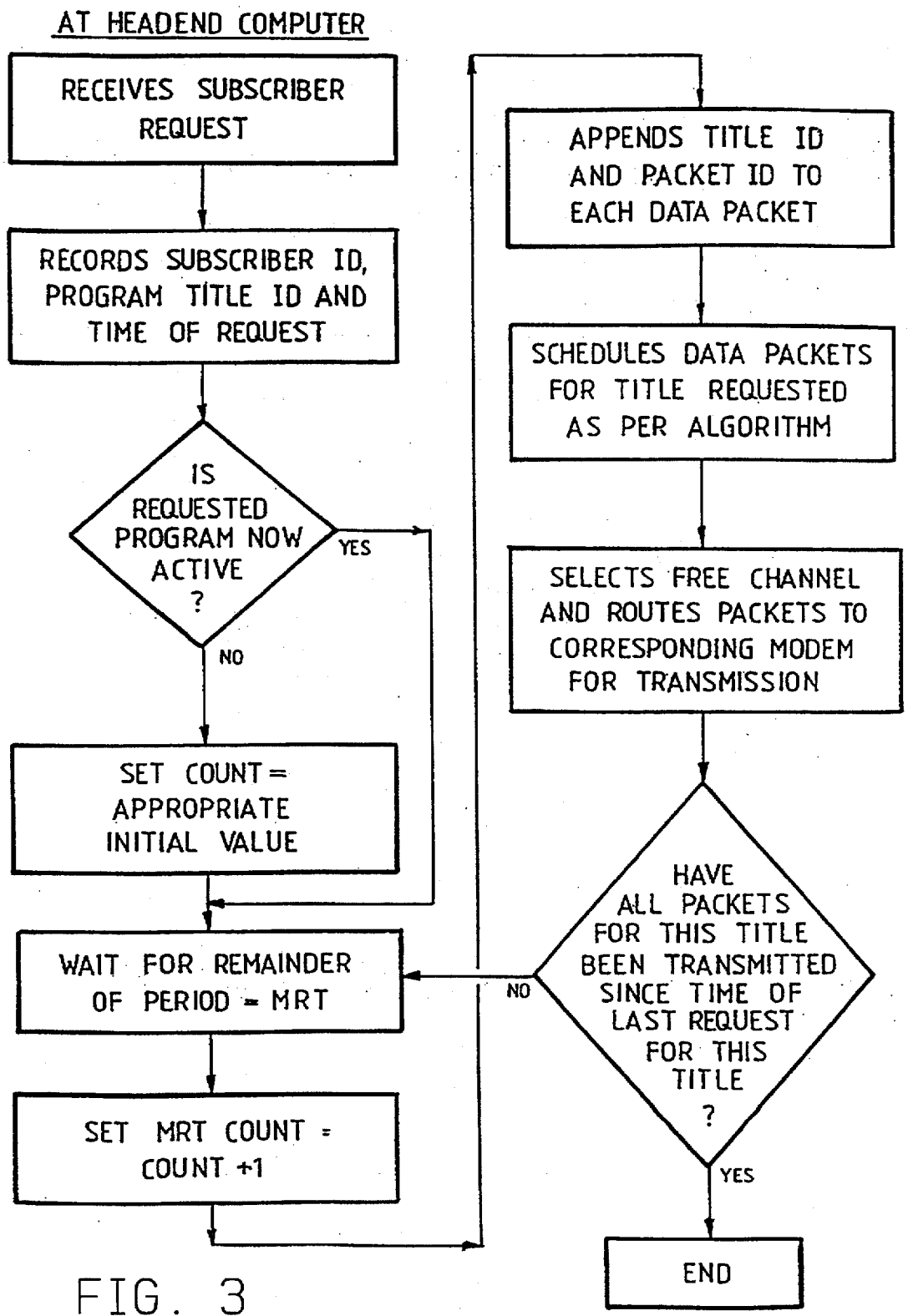
FIG. 3 is a flow chart of the method steps employed at a head end of the video-on-demand system.
Figure 4:
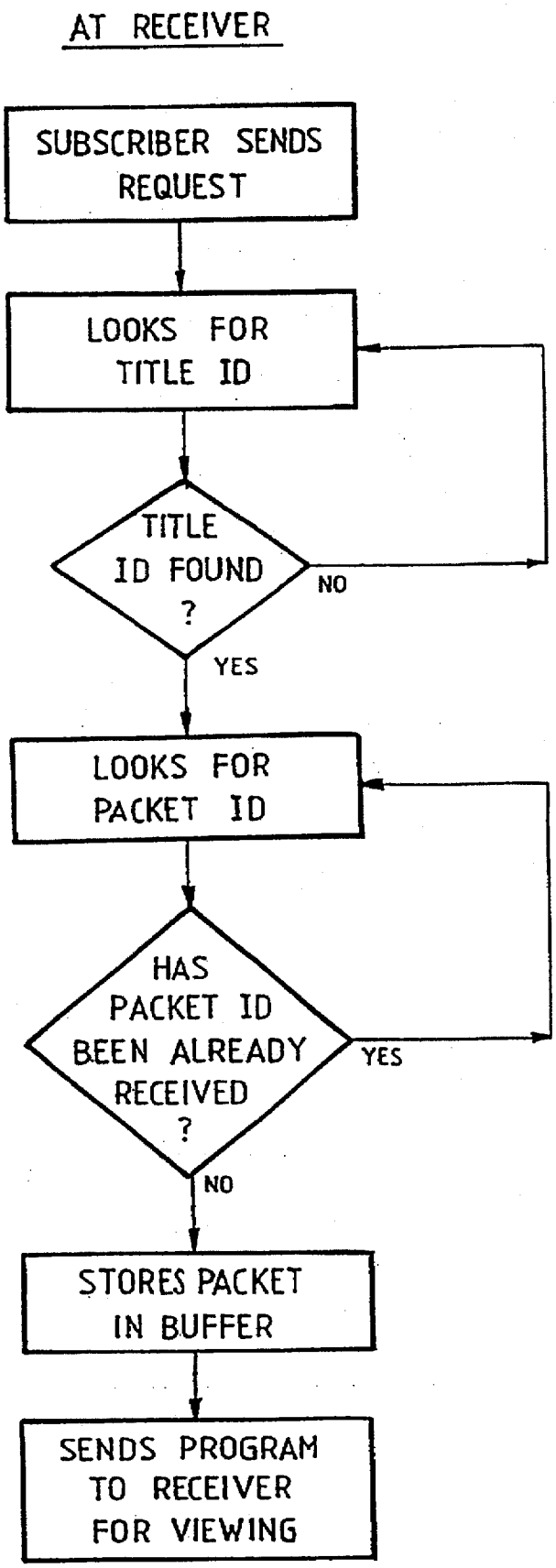
FIG. 4 is a flow chart of the method steps employed at a receiver of the video-on-demand system.

A typical software control sequence at both the head end computer and at the receiver will now be described with reference to FIGS. 3 and 4. When the head end scheduling and routing computer receives a subscriber request it records the subscriber ID, the requested program title ID and the time of request. The computer tracks each request and its progress towards completion in accordance with the scheduling algorithm. There will normally be several program streams being transmitted at any one time. The scheduling algorithm generates different data rates at different times as noted above. By staggering the entry value of COUNT for different program streams, the total data rate on the transmission medium can be maintained at a fairly constant level. Depending upon the value of COUNT at which a particular request enters the algorithm, the time taken to complete transmission of a requested program may range from 1 MRT to 1 VPT or any value in between.

Hence, when the head end computer has recorded the subscriber ID, title ID and time of request it determines whether the requested program is currently active, and if so enters the scheduling sequence at the conclusion of the current MRT time interval. If the requested program is not currently active then the COUNT value of the computer's internal counter, (may be a software counter) is set to the appropriate initial value to provide a staggering of the entry value of COUNT for each different program stream. Thus, for example, assuming requests are made simultaneously for programs A, B, C and D, service of the four requests can all commence simultaneously. However, program A would enter the algorithm scheduling sequence with COUNT equal to zero, B with COUNT equal to 1, C with COUNT equal to 2 and D with COUNT equal to 3. Thus, during each MRT time interval different numbers of video segments for each of the programs would be transmitted simultaneously, rather than the same number of video segments for each respective program.

At the commencement of the next MRT interval the computer enters the scheduling algorithm program sequence noted above and schedules the data packets for the title requested as per the scheduling algorithm. The computer also appends the title ID and packet ID to each data packet. The computer then selects a free channel and routes the data packets to the corresponding modem for transmission to the requesting receivers. The head end computer follows this sequence of steps until all of the packets for the requested title have been transmitted since the time of the last request for this title. As soon as the computer has determined that all pending requests have been satisfied, no further data packets for that program are transmitted.

At the receiver, after the subscriber has sent a request the receiver scans the transmission channels and looks for the title ID. When the receiver finds the title ID it looks for the packet ID and stores any packets not already received in the buffer storage. If a packet has already been received this packet is discarded and the receiver continues to look for the remaining data packets until all the data packets for the video program have been received. Data packets stored in the buffer storage may be sent to the receiver directly for immediate viewing or stored for later viewing. Although not illustrated in FIG. 4, the receiver may also be configured to look for its unique address ID to provide a degree of security against unauthorized data reception.

It will be appreciated that modifications can be made to the scheduling algorithm described above that would allow trade off's between transmission efficiency and the amount of buffer storage required. Commercial considerations will determine how the balance of system costs are weighted. If more is spent on receiver buffers, then less will be required to be spent on provision of transmission lines.

In an example of a modified scheduling algorithm it is possible to diverge from the requirement of always sending PKT1. In this case, PKT1 and other selected packets may be transmitted less frequently and held in available buffer storage space at the receivers until a request is lodged. For example, the following implementation can be adopted:

Each receiver is provided with low power buffer memory devices which are kept active at all times for receiving selected packets of video programs. Assuming there are, say, 10 core video programs, the receivers can be configured to store PKT1 of each of the 10 core video programs, PKT1 being only transmitted at predetermined intervals in accordance with the modified scheduling algorithm, rather than at each MRT as in the above described scheduling algorithm. Hence, when a request for a core program is lodged, the first packet is already in the receiver buffer memory and can be immediately accessed for viewing while the modified scheduling algorithm is then implemented. This can reduce transmission bandwidth requirements considerably by prefilling the unused portion of the buffer memory prior to when playback is started.

It is also possible to reduce peak transmission loads by diverging from the requirement that all requests start to be serviced within a maximum period equal to MRT. By accepting a small percentage of service delays, it is possible to further smooth the transmission load.

SEGMENT ACCEPTANCE AND REJECTION CRITERIA

Figure 20:
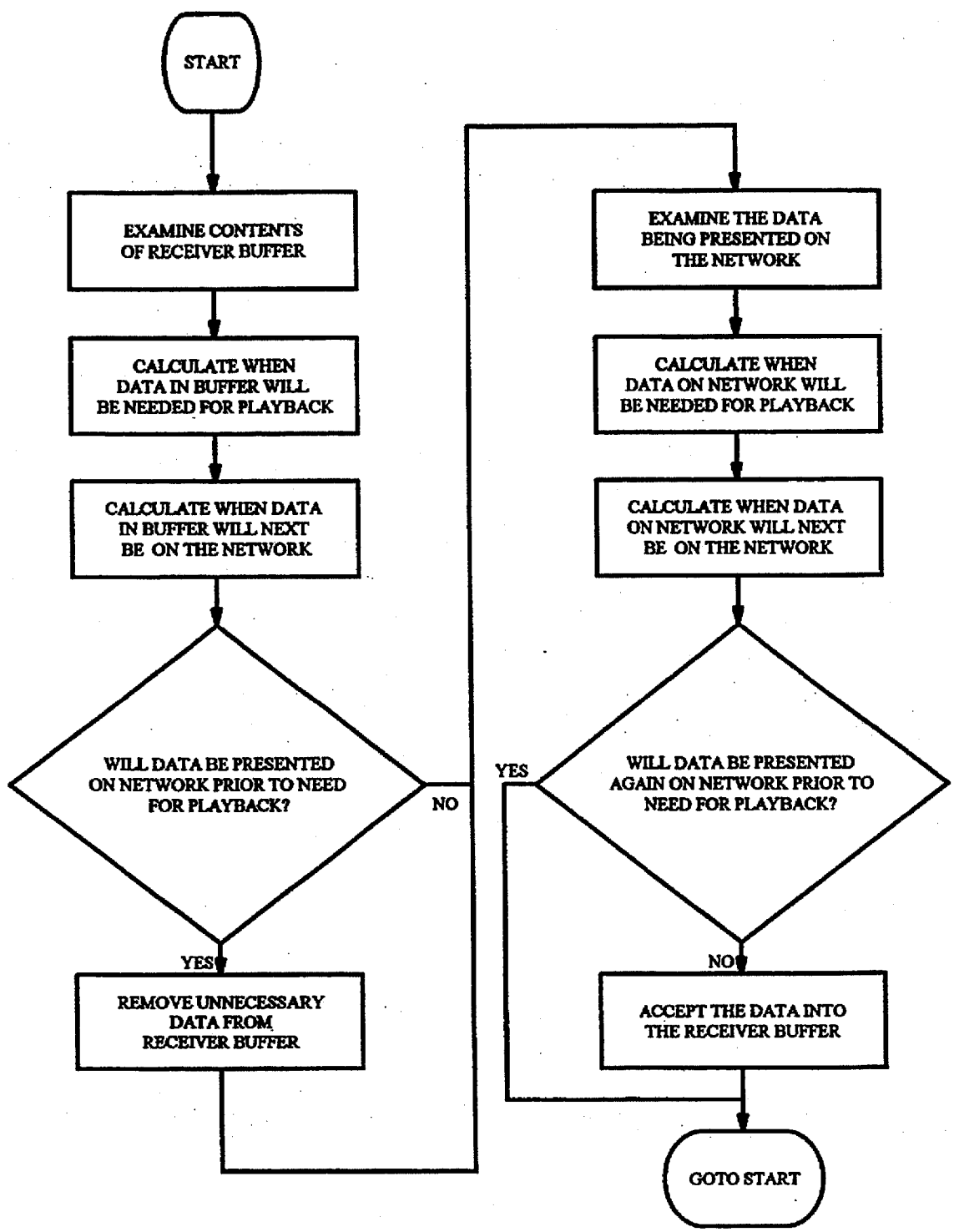

In each of the following described examples of program transmission optimization systems, a receiver that has requested a program must monitor data being transmitted from the head end and accept segments it does not currently have but will need prior to that data being transmitted from the head end again. FIG. 20 illustrates a typical process employed by the receiver for receiving data into its buffer. This process is similar in some respects to that illustrated in FIG. 4.

When a user of the receiver selects a particular program being broadcast from the head end, for example, over a cable TV network, the receiver examines the contents of the buffer memory to identify segments relating to the selected program. If any of the segments are already in the receiver buffer, it then makes two calculations to determine whether the segments should be kept in the buffer or removed. Firstly, it calculates when the segment will be needed to provide normal playback of the program to the user. Secondly, it calculates when that segment will next be transmitted from the head end of the network. Based on these two calculations, the receiver can then determine whether the segment will be available again on the network before it is needed for normal playback. If it will be, such segments are removed from the receiver buffer and the receiver then proceeds to the next step in the decision process. However, if the segments will not be available again before they are needed, it keeps the segments in the receiver buffer and proceeds with the next step in the decision process.

The receiver then examines the data being transmitted on the network to identify segments relating to the selected program. It then determines whether the identified segments are already in its buffer, and if so ignores the data and continues to monitor the data being transmitted on the network. However, if a received segment is not already in the receiver buffer, it then makes the same two calculations as above in order to determine whether the segment should be accepted into the buffer. Firstly, it calculates when the segment will be needed to provide normal playback of the program to the user. Secondly, it calculates when that segment will next be transmitted from the head end on the network. Based on these two calculations, the receiver can then determine whether the segment will be available again on the network before it is needed for normal playback. If so, the segment is rejected and the receiver returns to the start of the decision process. However, if the segment will not be available again before it is needed, it accepts the data into the receiver buffer. This process ensures that redundant segments are not unnecessarily accepted by the receiver, and therefore helps to minimize the buffer storage space required.

The receiver then returns to the start of the decision process to determine if there is data already in the buffer that should be removed from the buffer because the same data will be presented on the transmission system before it is required for play back. Such a circumstance can easily occur if the receiver is put into a paused condition. If it is paused long enough, then some of the data that is currently in the buffer will be presented on the transmission system again before it is needed for playback. Consequently, the area of the buffer occupied by that data can be freed for use.

There are at least two possible approaches the system can use to accomplish the two-step decision process for accepting or rejecting incoming segments:

(1) The transmitter at the head end identifies all of the data it sends out to indicate where the data fits chronologically in the entire video sequence, and how much time will elapse before it is again transmitted on the network. The receiver knows at what chronological point it is currently at in the playback process, and it calculates when the incoming data will be needed, if at all, assuming the playback process continues at a normal playback rate. The receiver extracts the information from the transmitted data that indicates when that particular segment will next be available and compares this to the time when the segment will be needed. If it needs the segment sooner than it will next be available, it then accepts the data into the buffer.

(2) Instead of the head end continuously transmitting identifying information with all of the data, it can periodically send the parameters of the scheduling algorithm in use. The receiver can then determine the order in which segments will arrive and essentially identify the incoming data internally. This reduces the amount of overhead that would be needed to identify the data, but it increases computational requirements in the receiver.

These basic acceptance and rejection tests are imposed in the following discussions, however for reasons of clarity and simplification, they may be dealt with in different terms or from a different view point.

Figure 7A:
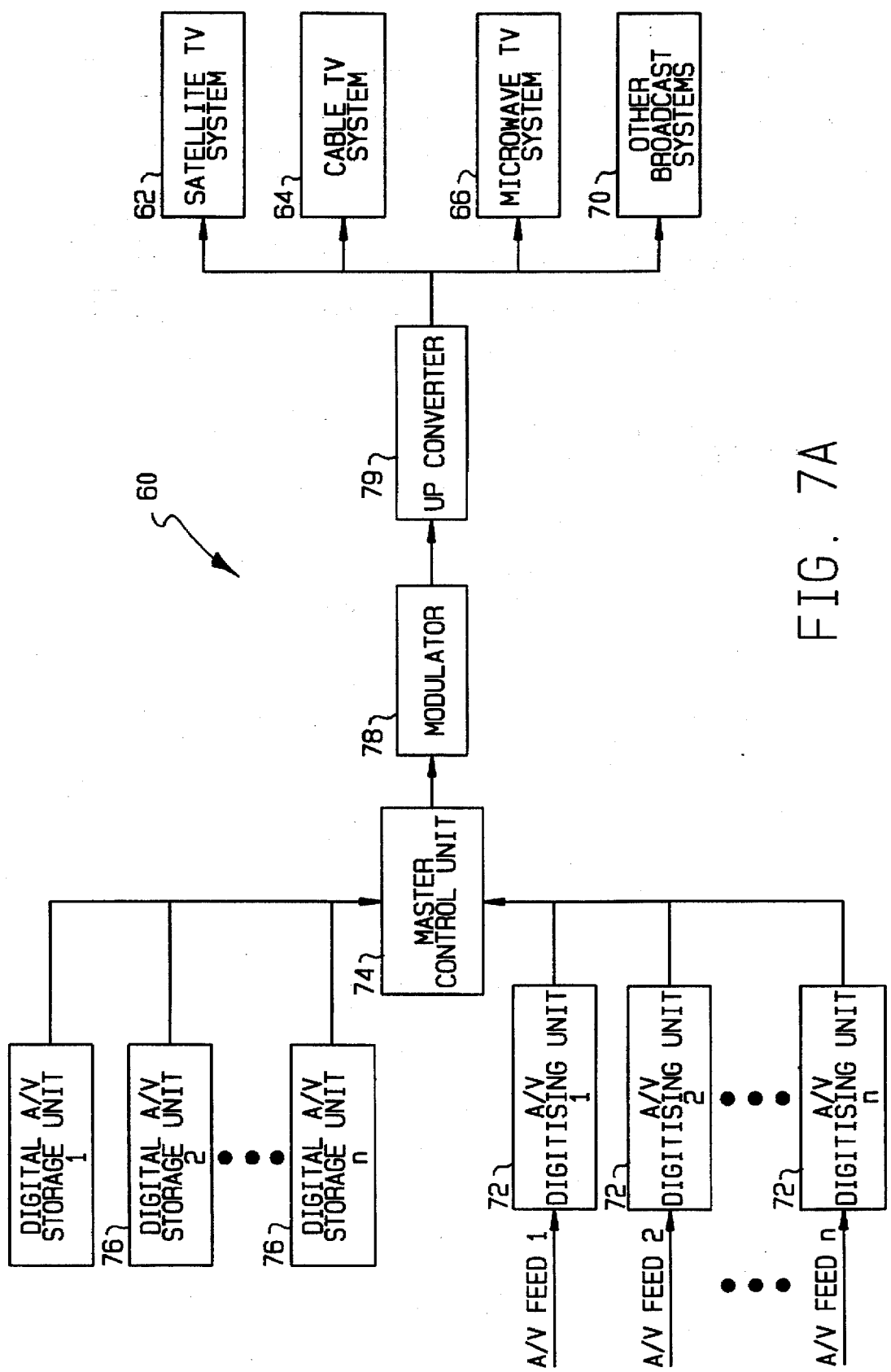
FIGS. 7A and 7B are block diagrams of another embodiment of a program transmission optimization system according to the invention.
Figure 7B:
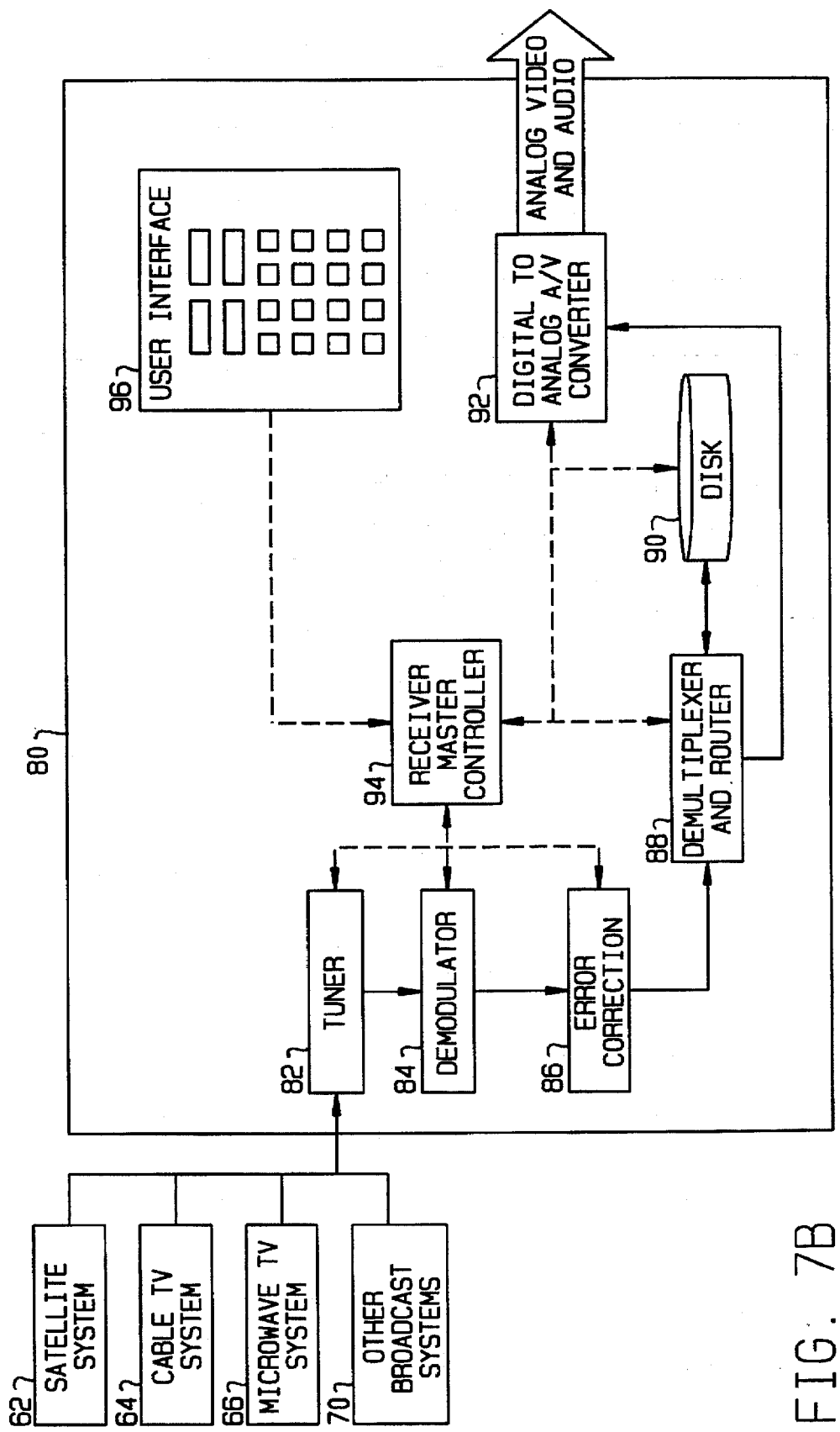

In the first embodiment of a program transmission optimization system according to the present invention described above in relation to FIGS. 1 to 4, a bi-directional request and distribution network is provided to allow each of the receivers 22 to communicate with the head end of the system when requesting a particular program for viewing. However, in many situations it is not necessary to provide for bi-directional communication between the multiple receivers and the head end of the system if, for example, the system provides program transmission optimization for a preselected number of programs over a predetermined number of transmission channels. There are many applications such as, for example, hotels and aircraft, where the provision of a preselected number of video programs, such as the ten most popular video titles is adequate to satisfy the requirements of users for video on demand. FIGS. 7A and 7B illustrate another embodiment of the program transmission optimization system in the form of a video transmission optimization (VTO) system in which typically the receivers do not communicate with the head end when requesting a particular video program. FIG. 7A is a functional block diagram of the head end of the system, whereas FIG. 7B is a functional block diagram of a receiver.

The transmitter system 60 at the head end of the video system is designed to multiplex one or more video sources into a single stream of program optimization data to be broadcast over various types of electronic transmission media. Illustrated examples of electronic transmission media are a satellite TV system 62, a cable TV system 64 and a microwave TV system 66, although other broadcast systems 68 may also be employed. Currently, a size limiting factor in the VTO transmitter is the data rate that can be reliably carried over standard television channels. Depending upon the type of transmission carrier used and whether the television is normally used for NTSC, PAL or SECAM television signals, the data rate will range from 20 megabits per second to 50 megabits per second.

One source of audio visual input to the system is standard analog audio/video signals designated A/V FEED 1 through n. These signals may come from audio/video sources such as video tapes or off-air reception. The A/V FEEDs are digitized by the A/V digitizing units 72 (1 through n). An example of the type of system used for the A/V digitizing units is the MPEG (Motion Picture Expert Group) video compression systems made by Optibase Corporation. The individual bit streams from the A/V digitizing units 72 will range in data rate from approximately 1 megabyte per second to 15 megabits per second. These data streams are routed to a master control unit 74. Typically the channels to carry these data streams to the master control unit 74 are high speed data links such as SCSI 2, or Ethernet.

The master control unit 74 can also be supplied with digital audio/video data from one or more digital A/V storage units 76. These digital A/V storage units 76 are typically disc drives and contain data that has been previously digitized either by one or more of the A/V digitizing units 72, or digitized externally and introduced to the transmitter system 60 in digital format. The number of A/V digitizing units 72 and digital A/V storage units 76 is determined by the overall data capacity of the transmission channel used and the data rate of the program optimization data streams that are produced by the system 60.

The master control unit 74 is a general purpose computing engine such as a personal computer running a multi-tasking operating system such as UNIX. In this embodiment, the master control unit 74 controls the segmentation of data to produce program optimization streams for particular audio/video selections. In addition to producing individual program optimization streams it also multiplexes multiple streams into a single stream to be broadcast over the transmission media. The master control unit 74 channels data from the A/V digitizing units 72 directly onto the transmission channel and also to one or more of the A/V storage units 74 if required. This permits the system to transmit live television feeds as they are generated as well as staging the digitized data to the A/V storage units 76 for broadcast as program optimization streams.

The output from the master control unit 74 is routed to a modulator 78 which would typically be a QAM (Quadrature Amplitude Modulation) or QPSK (Quadrature Phased Shift Key) system of the kind sold by Comstream Corporation. The interconnection between the master control unit 74 and the modulator 78 is typically a synchronous serial link such as RS422. The Up convertor 80 is an industry standard unit that injects the modulated signal into the transmission channel of choice.

FIG. 7B illustrates a preferred form of receiver system 80 for the VTO system. The solid lines on FIG. 7B represent audio-visual data and the broken lines represent control and status data. The input to the receiver system 80 is the modulated signal that was broadcast over a channel of the transmission media from the transmitter system 60 illustrated in FIG. 7A. The signal is selected by the tuner 82 and demodulated by the demodulator 84. The resulting data is checked for errors in error corrector 86 and reconstructed to be a true representation of the data that was broadcast. Comstream Corporation makes an appropriate range of modules that incorporate the three functional blocks of tuner 82, demodulator 84 and error corrector 86. The error-corrector data is presented to the demultiplexor and router 88 which demultiplexes the data and routes it to either disc 90 providing buffer storage, or to digital to analogue A/V convertor 92 for direct output to a standard television set (not shown). The functions and data flow through the receiver 80 are controlled by the receiver master controller 94.

The master controller 94 monitors the status of the various system elements and exerts control over these elements as necessary to carry out the program optimization decisions to accept or reject data presented by the incoming broadcast data streams, and to maintain or discard data that is currently held in the disc 90. The function of the master controller 94 may be implemented by a micro processor such as those in the Motorola 683XX family of processors suitable for embedded applications. The functions of the demultiplexer and router 88 may be appropriately carried out by a chip such as the C-Cube CL9110 demultiplexer chip. A typical device for the buffer storage disc 90 would be a 2.5 inch to 3.5 inch IDE disc drive with a capacity of 200 megabytes to 600 megabytes. The capacity of the disc required is a function of the particular implementation of the program optimization algorithm being used.

A user interface 96, which may include a key pad and appropriate LCD displays is used by the user of the receiver 80 to select the desired video program as well as other standard functions such as, for example, pause, fast forward, and/or replay. Depending upon the selections made by a user via the user interface 96, the master controller 94 ultimately enables the transfer of digital data to the digital to analogue A/V convertor 92 to be restored to analogue audio/video signals for output to a standard television set. The digital to analogue A/V convertor 92 may typically consist of a C-Cube CL450 MPEG video decoder and any one of a number of MPEG audio decoder systems. When the user selects a particular video program via the user interface 96, the master controller 94 is able to select the appropriate channel from the transmission media using tuner 82, and then identifies the particular segments belonging to the selected program that are being transmitted according to a scheduling algorithm over that channel. The decision process for accepting or rejecting data presented by the incoming broadcast data streams, employed by the receiver 80, will be described below with reference to FIG. 20.

FIGS. 8 to 10 illustrate another technique for dividing a program into segments for transmission according to a scheduling algorithm. In the first column of the table in FIG. 8 the entire program is illustrated as a single block (heavy lines), and in the second column the entire program is shown divided up into eight equal segments numbered 1 to 8 respectively. Segment 1 is at the beginning of the program whereas Segment 8 is at the end of the program.

The eight segments are equal in terms of the amount of playback time they represent. For example, if the entire program is 120 minutes long, then each segment represents 15 minutes of playback time. Each of the eight segments is then divided up into smaller segments or fragments. Each of the eight segments is divided into as many fragments as the number of that segment. Therefore, Segment 1 is divided into one fragment, Segment 2 is divided into two fragments, and so forth. Each fragment is identified in FIGS. 8 to 10 by its segment number followed by the fragment number separated by a colon. The full Segment:Fragment nomenclature is then 1:1, 2:1, 2:2, 3:1, 3:2, . . . 8:6, 8:7, 8:8.

In FIG. 8 each of the fragments is depicted so that its area is proportional to the playback time of the fragment. This means for constant data rate video, the fragment's area is also proportional to the amount of data pertaining to that fragment. It can be seen that the area of Fragments 2:1 and 2:2 is half that of Fragment 1:1. Likewise, the area of the Segment 8 fragments is one eighth the area of the Segment 1 fragment. The last column in the table of FIG. 8 identifies the fragment size as a fraction of the total program playback time. If the entire program has a playback time of 1.0 then it will be seen that the relative sizes of each of the fragments are as follows:

Segment 1 Fragment size is 1/8/1=0.125,
Segment 2 Fragment size is 1/8/2≈0.063.
Segment 3 Fragment size is 1/8/3≈0.042,
Segment 4 Fragment size is 1/8/4≈0.031,
Segment 5 Fragment size is 1/8/5≈0.025,
Segment 6 Fragment size is 1/8/6≈0.021,
Segment 7 Fragment size is 1/8/7≈0.018,
Segment 8 Fragment size is 1/8/8≈0.016.

FIG. 9 is a table illustrating a preferred sequence of transmission of the fragments in FIG. 8 according to an alternative scheduling algorithm. In FIG. 9, the term "interval" refers to a length of time equal to the playback time of a full segment, therefore the playback time of the entire program is equal to eight intervals. As can be seen in FIG. 9, during Interval 1 all of the number 1 fragments (1:1, 2:1, 3:1, 4:1, 5:1, 6:1, 7:1 and 8:1) are transmitted. Thereafter, the next sequential fragment is transmitted in successive intervals until the last fragment for that segment is encountered. At that point, the sequence of fragments transmitted begins again from the first fragment of that segment. Hence, as can be seen most clearly in FIG. 9, the fragment 1:1 (which corresponds to Segment 1) is transmitted during each interval, whereas the first fragment of Segment 2 is transmitted every alternate interval and the second fragment of Segment 2 is transmitted during intermediate intervals.

The column headed "Fragment Bandwidth" in the table of FIG. 1 shows the values carried over from the last column in FIG. 8 headed "Fragment as Fraction of Total". As a result of the scheduling algorithm illustrated in FIG. 9, the total data transmitted or the bandwidth required during any particular interval remains constant at 0.340 of the total program. Since an interval is equal in duration to the playback time of a segment, and there are eight segments, then the total bandwidth required is 8×0.340=2.718.

This compares exactly to the figure derived using equation (3) to calculate bandwidth:

$$\text{TOTAL DATA} = \sum_{\text{Segment Number}=1}^{\text{Number of Segments}=12} 1/1 + 1/2 + 1/3 + 1/4 +$$
$$1/5 + 1/6 + 1/7 + 1/8 + 1/9 + 1/10 + 1/11 + 1/12$$
$$= 3.103$$

With this implementation it can be seen that the bandwidth requirement from one interval to the next remains constant and that it is at the theoretical minimum. With the sequence of transmission illustrated in FIG. 5, in accordance with the previously described scheduling algorithm, the bandwidth requirement has wide variations between successive transmission intervals, although given sufficient length of time the average bandwidth requirement would be equal to the theoretical minimum.

The playback of the program segments transmitted in accordance with the sequence of FIG. 9 is illustrated in FIG. 10. FIG. 10 is divided into three parts from top to bottom, namely, "Incoming Fragments" received by the receiver, "Segment (Fragments) Playing Back" at the receiver and the "Buffer Contents" during each interval considered. In the illustrated example of FIG. 10, the receiver is requested to start playing the program during Interval 7.

Incoming fragments indicates the fragments accepted by the receiver in that particular interval. The acceptance criteria for taking in fragments is to accept a fragment if it is part of a segment that has a number higher than the segment currently being played back by the receiver.

Fragments playing back indicates the fragments that are being played back during each interval. Irrespective of the order in which the fragments of a segment were received, the fragments are now played back in numerical order.

Buffer contents indicates the fragments that are present in the buffer of the receiver. This is the state of the buffer at the end of the interval.

The process adopted by the receiver for playing back the program is as follows. The receiver gets a command to start playing a particular program. This command can come at any random moment in time, however the receiver must wait until it has received all of the fragments transmitted in one complete interval. Hence, in the example illustrated the receiver does not start accepting data until the beginning of Interval 8. At this point in time the playback interval is equal to zero since playback has not yet commenced. At the beginning of Interval 8, the receiver starts accepting fragments if the segment number of the fragment is greater than the playback interval. Hence, during Interval 8 all received fragments are accepted. No segments are played back yet. The buffer contents at the end of Interval 8 are shown directly below the incoming fragments during Interval 8. At the end of Interval 8 the buffer contains one fragment from each of the eight segments.

At the beginning of Interval 9, the playback can commence. The playback interval is now set to 1. Hence, when the acceptance test is made for incoming fragments, only fragments of segments greater than one will be accepted. This is illustrated in the incoming fragments for Interval 9. Simultaneously, the fragment playing back is Fragment 1:1 (Segment 1). The buffer contents at the end of Interval 9 are the aggregate of the fragments that were accepted during Interval 8 plus the fragments that have just been taken in during Interval 9. Played back fragments are deleted from the buffer contents, hence at the end of Interval 9 the fragment for Segment 1 is no longer shown in the buffer contents. The process of accepting fragments that are from segments greater than the playback interval, and deleting the fragments of segments that have been played back, continues until the last segment is played (during Interval 16).

At the bottom of the table in FIG. 10 an indication of the amount of buffer storage space required at the end of each interval is shown. This is expressed as a percentage of the total volume of data for the entire program. For example, if the entire program consisted of 1.2 gigabytes of data, then at the end of interval 10 the buffer storage requirement is 45.7% or 548.4 megabytes. This level of required buffer storage space is predictable and consistent which is an advantage over the implementation described above. Previously, the buffer excursions were wider and less predictable. With further enhancements, to be described below, the buffer storage requirement can be reduced at the expense of bandwidth, and/or the bandwidth can be reduced by utilizing the buffer storage space in an alternative manner that may require more buffer than is normally needed.

With the above described method of playback of the program at the receiver, the procedure for placing the playback in pause is relatively simple. When the receiver is put into pause, the playback interval remains static. At the beginning of a new incoming interval, two events occur. The normal acceptance test for incoming fragments is made, and only fragments of segments greater than the playback interval are accepted. The second event is the clearing of fragments that are no longer needed. Specifically, the oldest fragments held in the buffer will be received again before a playback interval is reached that requires them. Consequently, the receiver clears out all of the oldest fragments every time an incoming interval changes while the playback interval hasn't changed.

Figure 16:
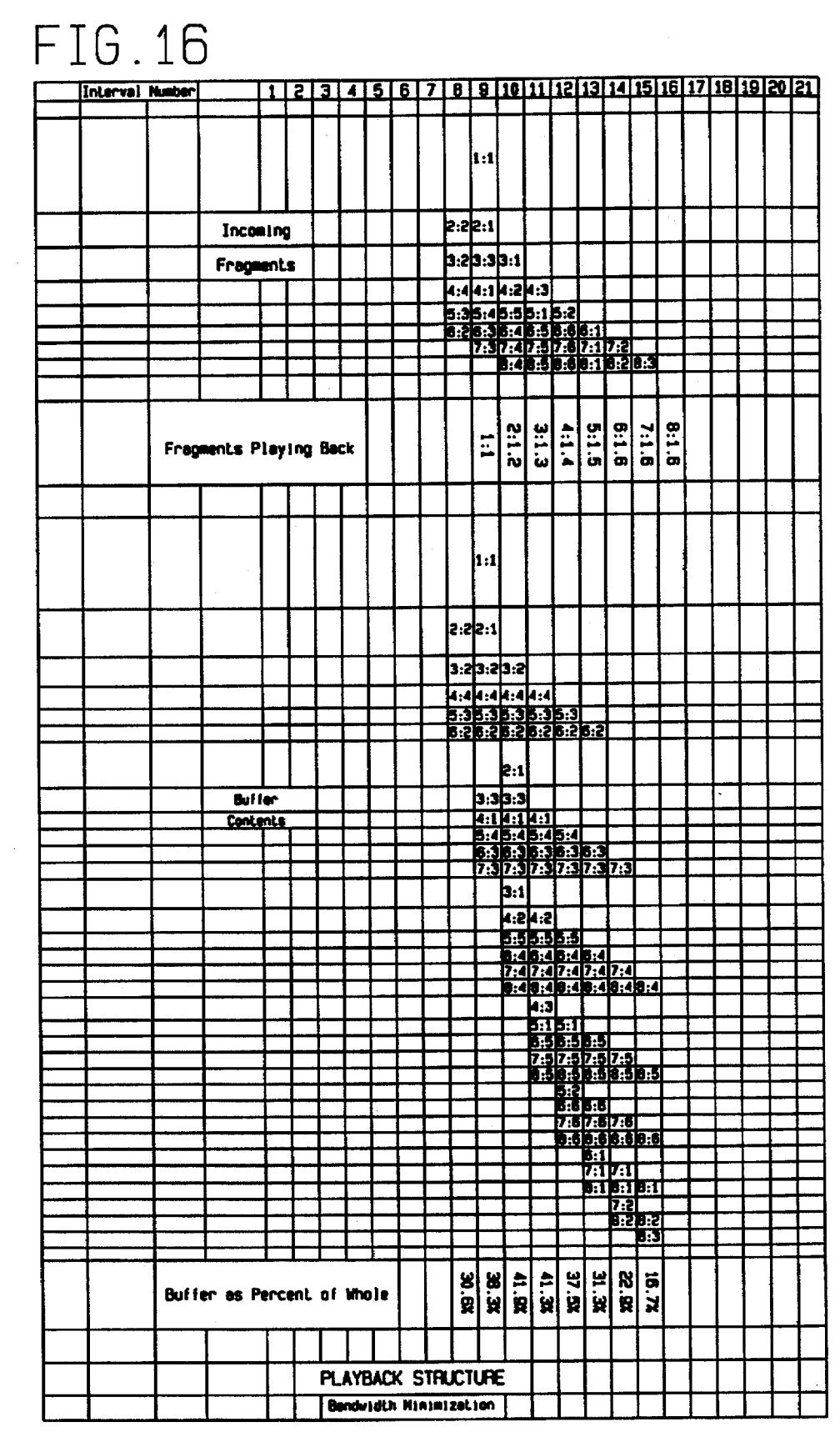

Various techniques for minimizing bandwidth and buffer storage space will now be described in detail. As noted above, these two aspects are not independent. Minimizing buffer increases the bandwidth required, whereas minimizing bandwidth uses the buffer in a manner that may impose a higher requirement on the buffer than normally required. Commercial considerations will normally determine how the balance of system costs are allocated. Bandwidth minimization will be described first, with reference to FIGS. 11 to 13, followed by buffer minimization with reference to FIGS. 14 to 16.

BANDWIDTH MINIMIZATION

Figure 12:
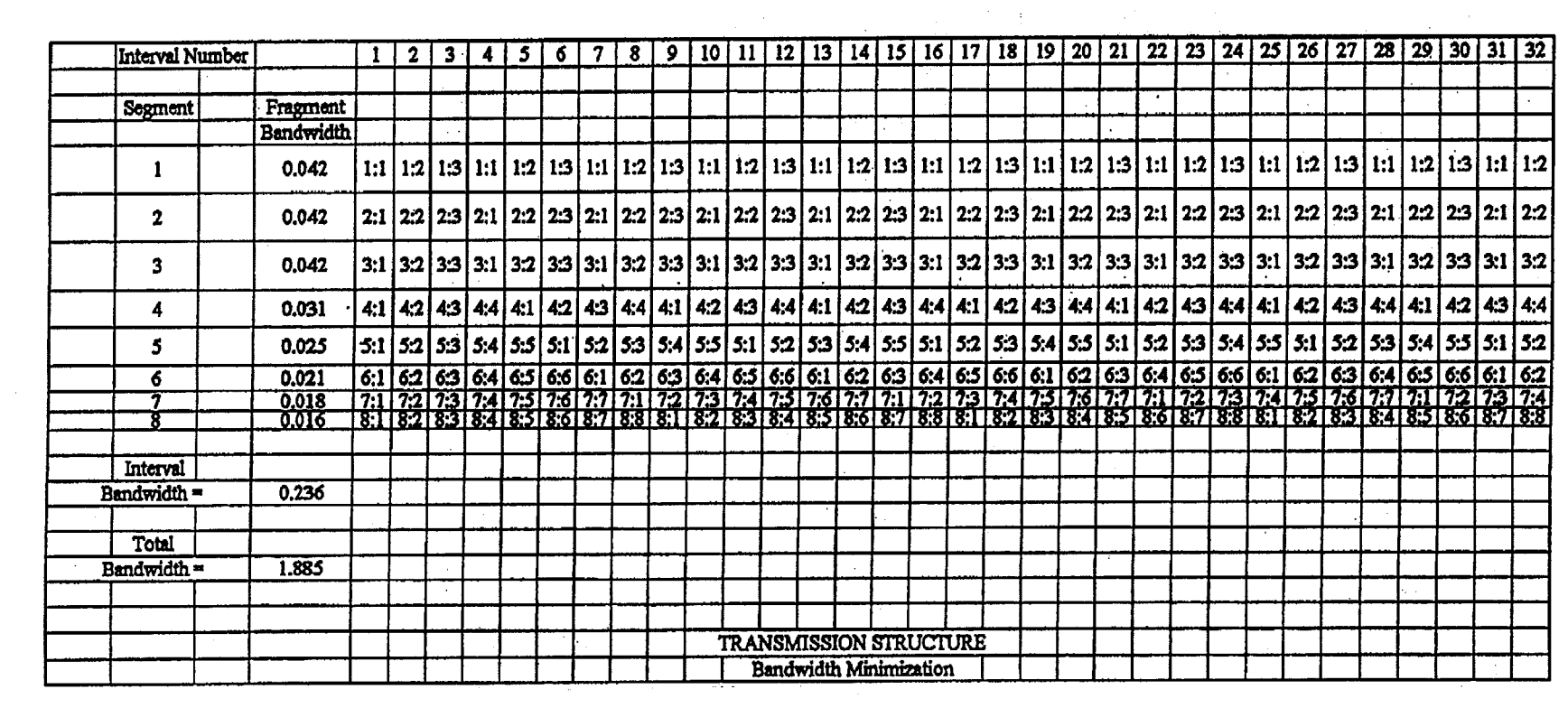

In a preferred approach to bandwidth minimization, the fragmentation of early occurring segments is increased as shown in the table of FIG. 11. If the table in FIG. 11 is compared to that of FIG. 8, it will be seen that Segments 1 and 2 are each divided into three smaller segments or fragments, whereas in FIG. 8 each segment is divided into as many fragments as the number of the segment. In FIG. 11, the latter is still true of Segments 3 to 8. The table in FIG. 12 is similar to that of FIG. 9, and indicates that the interval bandwidth has been reduced from 0.340 to 0.236, and the total bandwidth has been reduced from 2.718 to 1.885. A new calculation for bandwidth that accounts for bandwidth minimization can be made using the equation:

$$\text{TOTAL DATA} = \sum_{\text{Segment Number} = 1}^{\text{Number of Segments}} 1/\text{Number of Fragments for that Segment} \quad (4)$$

Using equation (4) the total data or bandwidth required can be calculated as follows:

$$\text{TOTAL DATA} = \sum_{\text{Segment Number} = 1}^{\text{Number of Segments} = 8} 1/3 + 1/3 + 1/3 + 1/4 + 1/5 + 1/6 + 1/7 + 1/8$$
$$= 1.885$$

From the above it will be seen that fragmenting the first two segments produces a significant reduction in the bandwidth requirement, however this is at the cost of buffer storage. To maintain the same start times as the previous example, it is necessary to receive the fragments for Segments 1 and 2 prior to allowing the receiver to start playing back. The segments are referred to as Hot Buffer Segments, because their use depends upon the receiver being "hot" (operating) prior to the point in time when a user might make a title selection. The normal receiver acceptance tests are applied to the Hot Buffered Segments. Because the Play Interval is equal to zero for all titles not currently playing, the data for a Hot Buffered Segment might be needed imminently yet it will not be presented again for some finite period, consequently the decision to accept the data is true for all Hot Buffered Segments not currently held in the buffer.

In order to commence playback during Interval 9, as in the previous example, it will be necessary for fragments from Segments 1 and 2 to be received no later than Interval 4. This would be analogous to the receiver being switched on at some point during Interval 3 and the receiver then buffers Segments 1 and 2 to be ready for playback at a future time. Therefore, at least a portion of the buffer in the receiver may be occupied by Hot Buffer Segments for some period prior to playback commencing. In the current example, the buffer state is quiescent at a level of 25.0% for intervals 6 and 7. If the system is running multiple titles, then there will be Hot Buffer Segments for all of the titles that are being delivered with Bandwidth Minimization.

The impact of Bandwidth Minimization on buffer requirements is as follows. If all of the titles being delivered over the system have a size of 100% and two of the eight segments are Hot Buffer Segments, then buffer space of 25% is required for each title. Hence, for a two title system, buffer space of 50% is required (percent of buffer space required for whole title). In the previous example as shown in FIG. 10, the maximum buffer space required is 45.7% in Interval 10. Therefore, if Bandwidth Minimization is being employed, it imposes a minimum on the buffer space required and this minimum amount may be greater than the buffer space needed during playback. Operationally, this may not have such a limiting impact. If an algorithm with 1000 segments and Hot Buffer Segments 1 and 2 is used, only 0.2% of the total title size is required to be allocated to Hot Buffer Segments. Consequently, if 45.7% is used as the maximum allowed buffer, then 228 titles (45.7÷0.2) could be accommodated. The unminimized bandwidth for a 1000 segment configuration is 7.485 and using Bandwidth Minimization for Segments 1 and 2 it decreases to 6.652. The use of bandwidth limitation places a lower limit on the amount of buffer required for bandwidth minimized titles. Titles that do not employ Bandwidth Minimization, however, do not take up buffer space. Therefore, it is possible for a system to offer a finite number of bandwidth minimized titles along with an infinite number of titles not using Bandwidth Minimization.

BUFFER MINIMIZATION

In order to decrease buffer storage requirements, the fragmentation of later occurring segments is decreased. For example, if the table in FIG. 14 is compared with that of FIG. 8, it will be seen that instead of Segments 7 and 8 being divided into as many fragments as the number of the segment, they are both fragmented into only six fragments. This has the effect of providing the fragments of these segments more often, hence they do not need to be held in the buffer for as long a period as would normally be the case. A new calculation for the total data using equation (4) above yields the following result:

$$\text{TOTAL DATA} = \sum_{\text{Segment Number}=1}^{\text{Number of Segments}=8} 1/1 + 1/2 + 1/3 + 1/4 + 1/5 + 1/6 + 1/6 + 1/6$$

$$= 2.783$$

The value of 2.783 agrees with the amount given in the table of FIG. 15 for the total bandwidth required using this modified scheduling algorithm.

In FIG. 10, fragments were accepted if the segment number of the fragment was greater than the play interval. To simplify the receiver acceptance test, it is necessary to identify a new variable called First Buffer Minimization Segment which is equal to the first segment in which the number of fragments is less than what it would normally be broken into. In the present example, the First Buffer Minimization Segment is Segment 7. Only fragments of segments greater than the play interval and less than (play interval+First Buffer Minimization Segment) are accepted by the receiver.

A series of acceptance tests for the first three intervals of play, being intervals 8, 9 and 10 is set out below. The results of these tests should be compared with the table in FIG. 16. It will be seen that the fragments for Segments 7 and 8 are not accepted into the buffer during Interval 8, and fragments from Segment 8 are not accepted during Interval 9, whereas in the example of FIG. 10 they were. Consequently, the fragments for these segments do not occupy the buffer space as much as they did in the earlier example. Reducing the number of fragments for Segments 7 and 8 means that there are fewer fragments overall, but each fragment is larger. Consequently, the bandwidth increases.

First Buffer Minimization Segment = 7
Interval         8
PlayInterval     0
PlayInterval + First Buffer Minimization Segment = 0 + 7 = 7

|              |         | Segment>PlayInterval | Segment<(PlayInterval+ FirstBufferMinimizationSegment) |
|--------------|---------|----------------------|--------------------------------------------------------|
| Fragment 1:1 | Accept  | 1>0 True             | 1<7 True                                               |
| Fragment 2:2 | Accept  | 2>0 True             | 2<7 True                                               |
| Fragment 3:2 | Accept  | 3>0 True             | 3<7 True                                               |
| Fragment 4:4 | Accept  | 4>0 True             | 4<7 True                                               |
| Fragment 5:3 | Accept  | 5>0 True             | 5<7 True                                               |
| Fragment 6:2 | Accept  | 6>0 True             | 6<7 True                                               |
| Fragment 7:2 | Reject  | 7>0 True             | 7<7 False                                              |
| Fragment 8:2 | Reject  | 8>0 True             | 8<7 False                                              |

Interval         9
PlayInterval     1
PlayInterval + First Buffer Minimization Segment = 1 + 7 = 8

|              |         | Segment>PlayInterval | Segment<(PlayInterval+ FirstBufferMinimizationSegment) |
|--------------|---------|----------------------|--------------------------------------------------------|
| Fragment 1:1 | Accept  | 1>1 False            | 1<8 True                                               |
| Fragment 2:2 | Accept  | 2>1 True             | 2<8 True                                               |
| Fragment 3:2 | Accept  | 3>1 True             | 3<8 True                                               |
| Fragment 4:4 | Accept  | 4>1 True             | 4<8 True                                               |
| Fragment 5:3 | Accept  | 5>1 True             | 5<8 True                                               |
| Fragment 6:2 | Accept  | 6>1 True             | 6<8 True                                               |
| Fragment 7:2 | Reject  | 7>1 True             | 7<8 True                                               |
| Fragment 8:2 | Reject  | 8>1 True             | 8<8 False                                              |

-continued

```
Interval        10
PlayInterval    2
PlayInterval + First Buffer Minimization Segment = 2 + 7 = 9
```

|  |  | Segment>PlayInterval | Segment<(PlayInterval+<br>FirstBufferMinimizationSegment |
|---|---|---|---|
| Fragment 1:1 | Accept | 1>2 False | 1<9 True |
| Fragment 2:2 | Accept | 2>2 False | 2<9 True |
| Fragment 3:2 | Accept | 3>2 True | 3<9 True |
| Fragment 4:4 | Accept | 4>2 True | 4<9 True |
| Fragment 5:3 | Accept | 5>2 True | 5<9 True |
| Fragment 6:2 | Accept | 6>2 True | 6<9 True |
| Fragment 7:2 | Reject | 7>2 True | 7<9 True |
| Fragment 8:2 | Reject | 8>2 True | 8<9 True |

Both bandwidth and buffer storage space can be minimized simultaneously. The Bandwidth Minimization operates for low numbered segments upward, and the buffer minimization starts with high numbered segments and works downward. The segments affected by either form of minimization cannot effectively overlap, so there is a practical limit to the amounts of minimization that can be jointly implemented.

The description given above with reference to FIGS. 8, 9 and 10 described another technique for dividing a program into segments for transmission according to a scheduling algorithm. Specialized techniques for bandwidth smoothing, which may have application in certain circumstances, will now be described. The main objective of these bandwidth smoothing techniques is to limit the wide bandwidth excursions that can occur with some implementations. For example, one possible area of use is the real time formatting of data from a live video feed, such as for a sporting event or on-the-scene news coverage. If the scheduling algorithm of FIG. 8 is employed, then all of a video sequence must be available prior to commencing the transmission because all segments have one of their fragments sent in the first interval (see FIG. 9). With the following implementation, a segment is never needed for transmission any earlier than it would normally be generated and broadcast. It is also feasible to start the transmission using the following technique, and then to seamlessly switch to the scheduling algorithm of FIG. 8.

Figure 19:
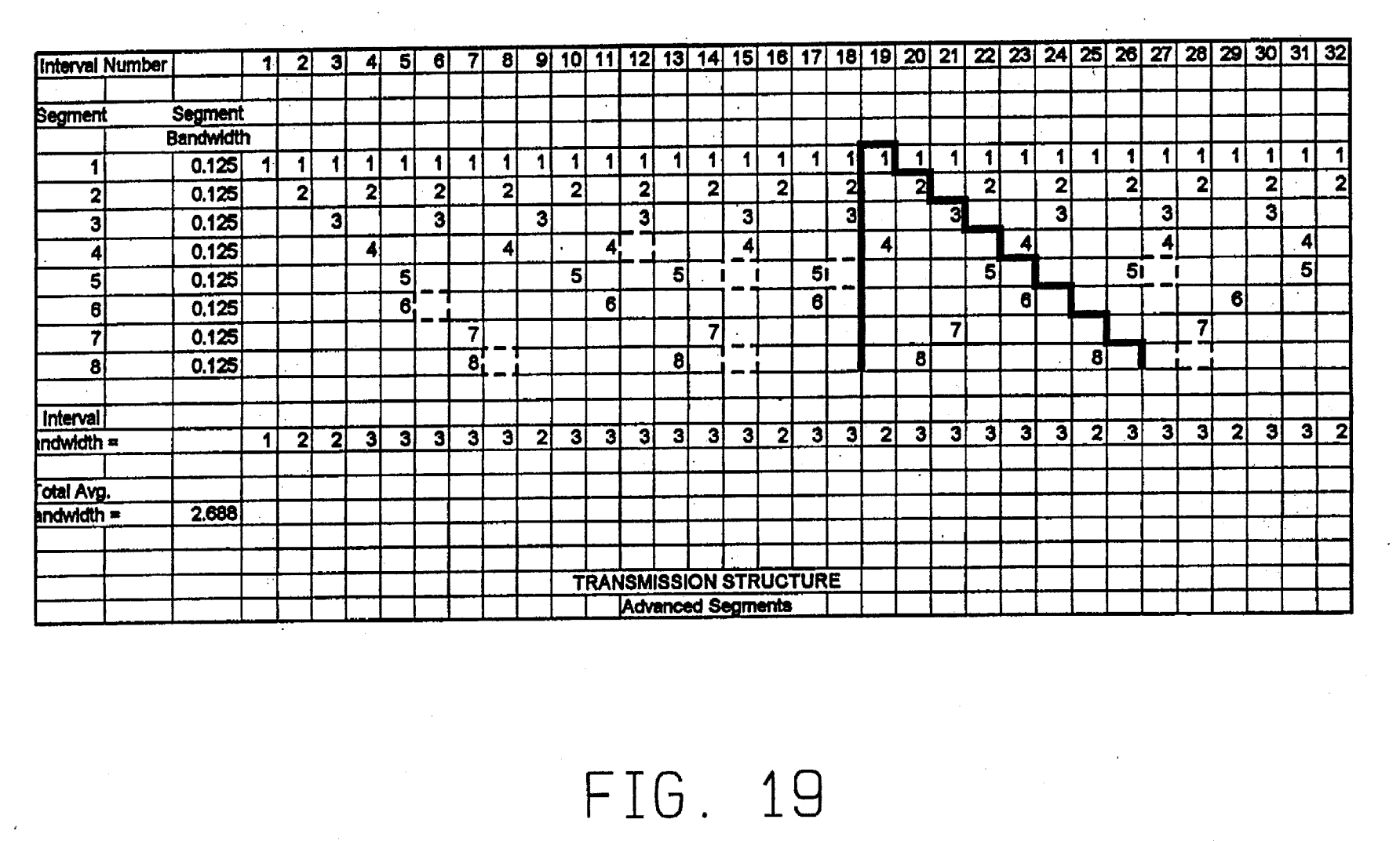

FIGS. 17, 18 and 19 have a common structure and are to be interpreted as follows. FIG. 17 is functionally equivalent to FIG. 5 although nomenclature is altered. FIGS. 17 to 19 indicate the progressive Interval Numbers in the top row and vertically underneath these Interval Numbers are indications of the Segments to be transmitted in that particular interval. The total number of Segments transmitted in an interval is indicated in the row titled Interval Bandwidth. Total Average Bandwidth is the arithmetic average of the values in the row titled Interval Bandwidth. The bold line with the stair step structure on its right indicates the reception of Segments by a receiver that starts its playback at the 19th Interval. A segment falling underneath the bold line is tested for acceptance into the receiver and is played back as its Segment Number is successively reached.

FIG. 17 is a table illustrating a sequence of transmission of segments according to an eight segment algorithm without the fragmentation of FIG. 8. This is a straight-forward version of the algorithm similar to that of FIG. 5 and will be used for comparison in the following examples.

The following sequence of Segment acceptance, playback and buffering applies to a receiver commencing playback in the 19th Interval.

| Interval<br>Number | Segments<br>Accepted | Segments<br>Played Back | Segments<br>Buffered |
|---|---|---|---|
| 19 | 1 | 1 | NIL |
| 20 | 2,4,5 | 2 | 4,5 |
| 21 | 3,7 | 3 | 7 |
| 22 | NIL | 4 | NIL |
| 23 | NIL | 5 | NIL |
| 24 | 6,8 | 6 | 8 |
| 25 | NIL | 7 | NIL |
| 26 | NIL | 8 | NIL |

From FIG. 17 it will be apparent that interval bandwidth is not constant, ranging from a minimum of 1 to a maximum of 6. If the transmission sequence were allowed to run indefinitely the maximum bandwidth would eventually reach 8. The following techniques provide for the limiting and smoothing of bandwidth. These methods prevent the bandwidth from exceeding a maximum, and in so doing reduce the bandwidth excursions so that they swing less widely. In the table of FIG. 17, the Total Average Bandwidth of 2.656 is the average of the figures given for interval bandwidth. If the algorithm were run for an indefinite period, the average would be 2.718, as in FIG. 9.

In the following two examples, the bandwidth is smoothed either by delaying or advancing selected segments.

The first example, illustrated in FIG. 18, involves delaying segments. In this example, segments are transmitted according to the scheduling algorithm during each interval, however a limit on the interval bandwidth is imposed. In this case, a limit of 3 has been imposed on the interval bandwidth. If the bandwidth that results exceed this limit, then transmission of a segment normally transmitted in that interval is delayed to a future interval that has less than three segments in it. In FIG. 17, it can be seen that normally in Interval 6 there would be four segments transmitted. However, in the example of FIG. 18 Segment 6 is delayed for one interval to Interval 7 which would normally only have two segments transmitted in it. Dotted line rectangles indicate the position where a segment would normally be transmitted. Similarly, in Interval 8 Segment 8 is delayed until Interval 9. After a segment is delayed, successive occurrences of that segment will be shifted when compared to the standard example of FIG. 17. They are not, however, necessarily delayed. The shifted segments resume their modulo until such time as there again occurs an excess of bandwidth in the interval into which they would normally occur.

The delayed segments cause occasional delays in some playback scenarios. Depending upon the point at which a playback starts, the delayed segments may or may not cause delays. The bold line staircase in FIG. 18 indicates a playback that starts in Interval 19. This playback will be delayed because of the delay of Segment 8 from Interval 25 to Interval 27. However, this playback will not suffer any delay because of the delayed Segment 7. The playback sequence commencing in Interval 19 would be as follows:

| Interval Number | Segments Accepted | Segments Played Back | Segments Buffered |
|---|---|---|---|
| 19 | 1,6 | 1 | 6 |
| 20 | 2,5 | 2 | 5 |
| 21 | 3,4 | 3 | 4 |
| 22 | 7 | 4 | 7 |
| 23 | NIL | 5 | NIL |
| 24 | NIL | 6 | NIL |
| 25 | NIL | 7 | NIL |
| 26 | NIL | NIL | NIL |
| 27 | 8 | 8 | NIL |

At interval 26, Segment 8 was neither in the buffer of the receiver nor was it presented at that time by the transmitter, consequently, the playback must be paused until Segment 8 is presented in the 27th interval. Alternatively, Segment 8 could be skipped in the playback sequence. Either action results in some degree of service degradation to the viewer.

Because this situation is known beforehand, the receiver can be signalled in advance that if it attempts to start in Interval 19, it will encounter a delay. The receiver may then delay the start of playback until Interval 20, so that the playback will proceed uninterrupted. Although the total average bandwidth (2.594) is lower in this example than in the standard example of FIG. 17, if the algorithm were allowed to run indefinitely the average bandwidth would be slightly less than 3.

FIG. 19 illustrates the technique of bandwidth smoothing by advancing selected segments. In this example, a bandwidth limit on the intervals is again imposed, and whenever this limit would normally be exceeded, the segment is advanced to be included in a previous interval. Thus, in Interval 6 there would originally have been four segments. Segment 6 has been advanced to Interval 5. Transmission of all succeeding occurrences of Segment 6 proceeds according to the modulo rule, unless the interval bandwidth again requires the segment to be advanced. From a practical point of view, a segment cannot be advanced any further than the previous occurrence of that segment. One advantage of this approach is that advancing segments does not cause delay during playback from any starting points. However, it does result in a higher total average bandwidth than the delaying technique.

The two techniques for bandwidth smoothing can also be employed together. Advancing of segments can be attempted and delaying can be employed as a second option. The same techniques can also be employed with fragmented or fractional segments. A bandwidth of 2.75 could be imposed and a segment would then be spread across multiple intervals. If this approach is taken to its extreme a similar result to that of the example illustrated in FIGS. 8, 9 and 10 is achieved.

REWIND AND FAST FORWARD

Basic Video-On-Demand functions of start-up pause, unpause and stop can be implemented with the examples given above. One method of implementing a partial rewind function can be implemented by reserving a portion of buffer space for the most recently played data. If, for example, space is reserved for the last 2 minutes of data that has been played, then rewind back to any point between 2 minutes ago and the current play position is possible.

Fast forward can be implemented by inserting extra information into the transmission stream or by speeding up the transmission of data in relation to the playback speed.

If a duplex communications system is used, then rewind and fast forward can be implemented by the receiver making requests for data that is required at a rewind or fast forward point that is not currently in the buffer. The transmitter then sends the data that is required to bring the receiver into synchronization with the transmitter for the play point required.

From the above description of preferred embodiments of the program transmission optimization system and method it will be apparent that the scheduling algorithms employed provide an efficient means of transmitting a program to multiple requesting subscribers who can commence playback of the program within a specified maximum response time. It will be apparent to those skilled in the electronics, television and telecommunication arts that numerous modifications and alterations may be made to the program transmission optimization system and method, other than those already described, without departing from the basic inventive concepts. For example, in alternative realizations of the system and method an optical fibre network may be employed for the distribution system, for example, to provide programming on demand for aircraft passengers. Furthermore, the system and method can operate using analog communications as well as digital, or a mixture of both. Although in the video-on-demand system described the video program segments are transmitted in compressed format, this is not an essential feature of the invention, since significant improvements in transmission efficiency can be achieved by relying upon the scheduling algorithm alone. All such modifications and alterations are to be considered within the scope of the present invention the nature of which is to be determined from the foregoing description and the appended claims.

We claim:

1. A method of transmitting a program to multiple users over a distribution system, the method comprising:
    at a head end of the distribution system, providing a program divided into a plurality of segments; and
    transmitting the segments from the head end to users' receivers such that, at least some of the segments are transmitted more than once, at different times, from the head end so as to enable multiple receivers of users requesting playback of the program at different times to simultaneously receive the segments required for continuous playback of the program.

2. The method of claim 1 wherein some of the segments are transmitted in a sequence which is different from a sequence in which such segments are subsequently played back.

3. The method of claim 2 further comprising storing each segment at users' receivers only once even if the same segment has been received more than once during the transmission of the program.

4. The method of claim 1 wherein at any given time the head end of the distribution system is not dedicated to transmitting the program to a predetermined number of receivers.

5. The method of claim 1 further comprising selecting a maximum response time corresponding to a maximum time interval a user need wait to commence playing back the program.

6. The method of claim 5 wherein each of the segments represents a portion of the program which playing time is equal to one maximum response time.

7. The method of claim 6 wherein the transmission of each set of the segments is separated in time by a time interval essentially equal to the maximum response time.

8. The method of claim 7 wherein the first segment of the program is transmitted during every maximum response time interval.

9. The method of claim 8 wherein a bandwidth limit is imposed so that at most a predetermined maximum number of segments is transmitted during any given maximum response time interval and further comprising delaying the transmission of a number of the segments exceeding the maximum number until an interval in which the number of segments scheduled for transmission is less than the predetermined maximum number.

10. The method of claim 8 further comprising imposing a bandwidth limit and transmitting a segment in an interval prior to the interval when it is scheduled for transmission if the number of segments scheduled for that interval exceeds the limit.

11. The method of claim 1 further comprising storing predetermined segments of predetermined programs at receivers of at least some of the users even if such predetermined programs are not presently being requested by the users in whose receivers the segments are stored.

12. A system for transmitting a program to multiple users comprising:
   means for providing a program divided into a plurality of segments at a head end; and
   means for transmitting the segments from the head end to users' receivers such that at least some of the segments are transmitted more than once, at different times, so as to enable multiple receivers of users requesting the program at different times to simultaneously receive the segments required for continuous playback of the program.

13. A method of transmitting a program to multiple users over a distribution system, comprising:
   at a head end of the distribution system, providing a program divided into a plurality of segments; and
   transmitting the segments from the head end to users' receivers, such that at least some of the segments are simultaneously sent to more than one receiver with no requirement at any time to dedicate the head end of the distribution system to any specific receivers.

14. The method of claim 13 wherein the segments represent portions of the program having equal playback time.

15. A system for transmitting a program to users comprising:
   means for dividing a program into segments;
   means for dividing at least some of the segments into a plurality of fragments;
   means for transmitting at successive intervals at least one fragment of the plurality of fragments of each segment that has been divided into the plurality of fragments; and
   means for receiving and storing the fragments of the segments, which have been divided into the plurality of segments, necessary for continuous playback of the program.

16. The system of claim 15 wherein each segment is consecutively numbered and the means for receiving accepts fragments relating to the segments that have numbers higher than the segment currently being played back.

17. The system of claim 15 wherein the fragments of each segment are consecutively numbered and the fragments are played back in numerical order.

18. The system of claim 17 wherein the played back fragments are deleted from the means for receiving and storing.

19. A method of transmitting a program to multiple users over a distribution system comprising:
   providing a program divided into a plurality of segments wherein at least some of the segments are divided into a plurality of fragments;
   during each predetermined time interval transmitting one fragment of each segment to users' receivers; and
   during each predetermined interval accepting at the receivers the fragments of the segments which have not yet been played back and deleting from the receivers the fragments of the segments which have been played back.

20. A method of transmitting a program to multiple users over a distribution system comprising:
   providing a program divided into a plurality of segments wherein at least some of the segments are divided into a plurality of fragments; and
   during each predetermined time interval transmitting one fragment of each segment to users' receivers;
   wherein each of the segments is divided into a number of fragments corresponding to a sequential position of such a segment in the program.

21. A method of transmitting a program to multiple users over a distribution system comprising:
   providing a program divided into a plurality of segments wherein at least some of the segments are divided into a plurality of fragments;
   during each predetermined time interval transmitting one fragment of each segment to users' receivers; and
   receiving and permanently storing fragments of initial segments of the program.

22. A method of transmitting a program to multiple users over a distribution system comprising:
   providing a program divided into a plurality of segments wherein at least some of the segments are divided into a plurality of fragments; and
   during each predetermined time interval transmitting one fragment of each segment to users' receives;
   wherein segments of the plurality of segments at an ending potion of the program are divided into fewer fragments than a sequential number of the segments in the ending portion of the program.

23. A method of transmitting a program to multiple users over a distribution system comprising:
   providing a program divided into a plurality of segments wherein at least some of the segments are divided into a plurality of fragments; and
   during each predetermined time interval transmitting one fragment of each segment to users' receivers;
   wherein segments of the plurality of segments belonging to a beginning portion of the program are transmitted more frequently than segments of the plurality of segments belonging to an ending portion of the program.

24. A receiver for receiving a program supplied to multiple users over a distribution system from a head end, said program being divided into a plurality of program segments, the receiver comprising:
   a buffer storage means for storing a plurality of program segments transmitted from the head end of the distribution system; and
   a processing means including means for determining whether segments already held in said buffer storage means will be presented on the distribution system prior to playback and removing the segments that will be presented a again prior to playback from the buffer storage means whereby, in use, the program segments required for continuous playback of the program will always be available at the receiver.

25. A method of transmitting a program to multiple users over a distribution system, the method comprising:
   at a head end of the distribution system, providing a program divided into a plurality of segments; and transmitting the segments from the head end to users' receivers such that, at least some of the segments are transmitted more than once at different times from the head end so as to enable multiple receivers of users requesting playback of the program at different times to simultaneously receive the segments required for continuous playback of the program;

wherein at least some of the segments represent a portion of the program having playing time essentially equal to one maximum response time, which is a maximum time interval a user needs to wait to commence playing back the program, and wherein transmission of each set of segments of the plurality of segments is separated in time by a time interval essentially equal to the maximum response time.

26. A method of transmitting a program to multiple users over a distribution system, the method comprising:

at a head end of the distribution system, providing a program divided into a plurality of segments; and transmitting the segments from the head end to users' receivers such that, at least some of the segments are transmitted more than once at different times from the head end so as to enable multiple receivers of users requesting playback of the program at different times to simultaneously receive the segments required for continuous playback of the program;

wherein at most a maximum number of segments, of the plurality of segments, is transmitted during a predetermined time interval, the transmission of other segments of the plurality of segments, exceeding the maximum number, is delayed until an interval in which the number of segments scheduled for transmission is less than the predetermined maximum number.

27. A method of transmitting a program to multiple users over a distribution system, the method comprising:

at a head end of the distribution system, providing a program divided into a plurality of segments; and transmitting the segments from the head end to users' receivers such that, at least some of the segments are transmitted more than once at different times from the head end so as to enable multiple receivers of users requesting playback of the program at different times to simultaneously receive the segments required for continuous playback of the program; and transmitting a given segment of the plurality of segments in a time interval occurring prior to a time interval when the given segment is scheduled for transmission, if a number of segments, scheduled for the interval when the given segment is scheduled for transmission exceeds a predetermined limit.

28. A method of transmitting a program to multiple users over a distribution system, comprising:

at a head end of the distribution system, providing a program divided into a plurality of segments; and transmitting the segments from the head end to users' receivers, such that at least some of the segments are simultaneously sent to more than one receiver with no requirement at any time to dedicate the head end of the distribution system to any specific receivers;

wherein each of the segments is divided into fragments such that the segments representing an ending portions of the program are divided into a greater number of fragments than the segments representing a beginning portions of the program.

29. The method of claim 28 wherein each of the segments is divided into a number of fragments that corresponds to a sequential position of such a segment in the program, so that the first segment is divided into one fragment, the second segment is divided into two fragments, the third segment is divided into three fragments and so forth.

30. The method of claim 29 wherein during each predetermined time interval at least one fragment of each segment is transmitted.

31. A method of transmitting a program to multiple users over a distribution system comprising:

providing a program divided into a plurality of segments wherein at least some of the segments are divided into a plurality of fragments; and during each predetermined time interval transmitting at least one fragment of each segment to users' receivers;

wherein initial segments of the program are divided into a greater number of fragments than that corresponding to the sequential position of such segments in the program and subsequent segments are divided into a number of fragments corresponding to the position of segments in the program.

32. The method of claim 31 further comprising during each predetermined interval accepting at the receivers the fragments of the segments which have not yet been played back and deleting from the receivers the fragments of the segments which have been played back.

33. A method of transmitting a program to multiple users over a distribution system comprising:

providing a program divided into a plurality of segments wherein at least some of the segments are divided into a plurality of fragments;

during each predetermined time interval transmitting at least one fragment of each segment to users' receivers; and wherein the fragments of the segments that represent an ending portion of the program are not accepted at the receivers when initial segments of the program are being played to a user in order to decrease the storage requirement of the receivers.

34. The method of claim 33 wherein the initial segments of the program are divided into a greater number of fragments than that corresponding to the sequential position of such segments in the program and subsequent segments are divided into a number of fragments corresponding to the position of segments in the program.

35. The method of claim 33 wherein the segments belonging to a beginning portion of the program are transmitted more frequently than the segments belonging to the ending portion of the program.

36. The method of claim 33 wherein the predetermined interval is essentially equal to a playback interval of a segment.

37. A receiver for receiving a program supplied to multiple users over a distribution system from a head end, said program being divided into a plurality of program segments, the receiver comprising:

a buffer storage means for storing a plurality of program segments transmitted from the head end of the distribution system; and means for determining whether segments presented on the distribution system will be presented again prior to playback and rejecting the segments that will be presented again, but accepting the segments that will not be presented again for storing in the buffer storage means.

* * * * *